United States Patent
Bantanur et al.

(10) Patent No.: US 11,989,721 B2
(45) Date of Patent: May 21, 2024

(54) AUTOMATED MULTI-PARTY TRANSACTION DECISIONING SYSTEM

(71) Applicant: Capital One Services, LLC, McLean, VA (US)

(72) Inventors: Vijay Sahebgouda Bantanur, Gaithersburg, MD (US); Muralidharan Balasubramanian, Gaithersburg, MD (US); Julie Dallen, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 244 days.

(21) Appl. No.: 17/406,664

(22) Filed: Aug. 19, 2021

(65) Prior Publication Data

US 2023/0067467 A1 Mar. 2, 2023

(51) Int. Cl.
*G06Q 20/36* (2012.01)
*G06F 18/21* (2023.01)
*G06F 18/214* (2023.01)
*G06N 20/00* (2019.01)
*G06Q 20/00* (2012.01)
*G06Q 20/40* (2012.01)

(52) U.S. Cl.
CPC ....... *G06Q 20/3674* (2013.01); *G06F 18/214* (2023.01); *G06N 20/00* (2019.01); *G06Q 20/4016* (2013.01); *G06Q 20/405* (2013.01)

(58) Field of Classification Search
CPC ... H04M 15/805; G06Q 20/207; G06Q 20/29; G06Q 20/227
See application file for complete search history.

(56) References Cited

U.S. PATENT DOCUMENTS

| | | | |
|---|---|---|---|
| 7,702,584 B2 | 4/2010 | Omidyar | |
| 8,170,922 B2* | 5/2012 | Cavagnaro | G06Q 20/405 |
| | | | 705/26.1 |
| 8,494,913 B2 | 7/2013 | Cavagnaro | |
| 10,380,583 B1 | 8/2019 | Ellis et al. | |
| 10,579,975 B2 | 3/2020 | Coffman et al. | |
| 10,621,563 B1 | 4/2020 | Spindel et al. | |
| 10,922,761 B2* | 2/2021 | Ghosh | G06Q 20/207 |

(Continued)

OTHER PUBLICATIONS

Nov. 24, 2022—(WO) Invitation to Pay Fees/Partial Search Report and Provisional Opinion—App No. PCT/US2022/040790.

*Primary Examiner* — Saba Dagnew
(74) *Attorney, Agent, or Firm* — Banner & Witcoff, Ltd.

(57) ABSTRACT

Methods, systems, devices, and computer-readable media for a multi-party transaction decisioning system are provided. The system may analyze a purchase transaction associated with a first user and may identify that the transaction is associated with more than one party based on determining that an amount of the transaction is atypical for the first user. The system may identify a party associated with the multi-party transaction based on analyzing data associated with the first user. The system may generate a delegation request for a portion of the amount of the multi-party transaction to be delegated to the identified party and may transmit the delegation request to the identified party. Subsequently, the system may receive a payment transaction from the identified party, and the system may identify that the payment transaction is associated with the previously transmitted delegation request.

21 Claims, 8 Drawing Sheets

(56) References Cited

U.S. PATENT DOCUMENTS

| | | |
|---|---|---|
| 11,068,899 B2 * | 7/2021 | Howard ............... G06Q 20/326 |
| 2006/0178986 A1 | 8/2006 | Giordano et al. |
| 2013/0231974 A1 * | 9/2013 | Harris ................ G06Q 30/0201 |
| | | 705/7.29 |
| 2014/0180929 A1 | 6/2014 | Ohnishi et al. |
| 2014/0279098 A1 | 9/2014 | Ham |
| 2015/0019443 A1 | 1/2015 | Sheets et al. |
| 2015/0142661 A1 | 5/2015 | Jain et al. |
| 2015/0220999 A1 * | 8/2015 | Thornton ............ H04M 15/805 |
| | | 705/14.66 |
| 2015/0227957 A1 * | 8/2015 | Bradley ............... G06Q 20/227 |
| | | 705/14.27 |
| 2017/0004468 A1 * | 1/2017 | Stroeh .................... G06Q 20/29 |
| 2017/0236118 A1 * | 8/2017 | Laracey ............. G06Q 20/4014 |
| | | 705/44 |
| 2019/0180275 A1 | 6/2019 | Safak |
| 2019/0318347 A1 | 10/2019 | Aguiar et al. |
| 2020/0065800 A1 | 2/2020 | Kusnanto et al. |
| 2020/0265409 A1 | 8/2020 | Babu |
| 2020/0265457 A1 | 8/2020 | Miller et al. |

\* cited by examiner

AUTOMATED MULTI-PARTY TRANSACTION DECISIONING SYSTEM

CROSS-REFERENCE TO RELATED APPLICATIONS

This application is related to U.S. patent application Ser. No. 17/323,164, filed May 18, 2021, and entitled "Payment Delegation and Linking System," and U.S. patent application Ser. No. 17/406,688, filed Aug. 19, 2021, and entitled "Automated Multi-Party Event and Transaction Detection System." Each of these related applications is incorporated herein, by reference, in its entirety.

FIELD OF USE

Aspects of the disclosure relate generally to methods of managing transactions shared between multiple parties, and more particularly to methods of identifying and detecting such multi-party transactions.

BACKGROUND

Group events with friends, family, or co-workers often result in the sharing of expenses, such as for a meal, sports tickets, hotel rooms, etc. Often, for the sake of convenience and simplicity, a single member of the group will cover the expenses for the group and will settle up with the other group members at the conclusion of the event to collect shares of the expense owed by each of the other group members, respectively. This settling up process becomes complex when many individuals and/or transactions are involved—requiring the payor to recall which transactions are associated with which individuals, tally up total costs, tax, etc. for each individual, and request and then collect the funds, which are all time consuming tasks that are prone to human error. Existing systems provide rudimentary tools that allow a user to generate a request to share or split the expense of a given transaction with another individual, but these systems are limited in their ability to identify and detect transactions and expenses that may be associated with a group event and/or that require sharing with one or more other individuals.

SUMMARY

The following presents a simplified summary in order to provide a basic understanding of various aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the detailed description below.

Aspects of the disclosure relate to systems, apparatuses, computer-readable media, and methods for the automatic identification of transactions associated with multiple individuals. A user may make a purchase with a bank card or a credit card. The purchase transaction, when processed at a financial institution, may automatically be identified as a transaction potentially shared with multiple parties. For instance, the transaction may be identified, by a machine learning model, as a candidate multi-party transaction based on a determination that an amount of the transaction is atypical for the user in view of the user's historical transactions and patterns of spending and/or in view of characteristics related to the merchant associated with the purchase transaction. Upon identification of the candidate multi-party transaction and with the permission of the user, the user's data, such as email data, calendar data, contacts data, social media data, location data, or the like, may be accessed and analyzed to determine one or more parties potentially associated with candidate multi-party transaction. In some cases, similar data associated with other users may additionally be accessed and analyzed, with permission, to identify parties potentially associated with the candidate multi-party transaction. The user may be notified of the identified candidate multi-party transaction and the parties identified as potentially associated with the candidate multi-party transaction. Upon confirmation by the user that the identified transaction is a multi-party transaction, delegation of portions of an amount of the multi-party transaction may be initiated for settlement amongst the parties.

These and other features and advantages of the disclosure will be apparent from the detailed description provided below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
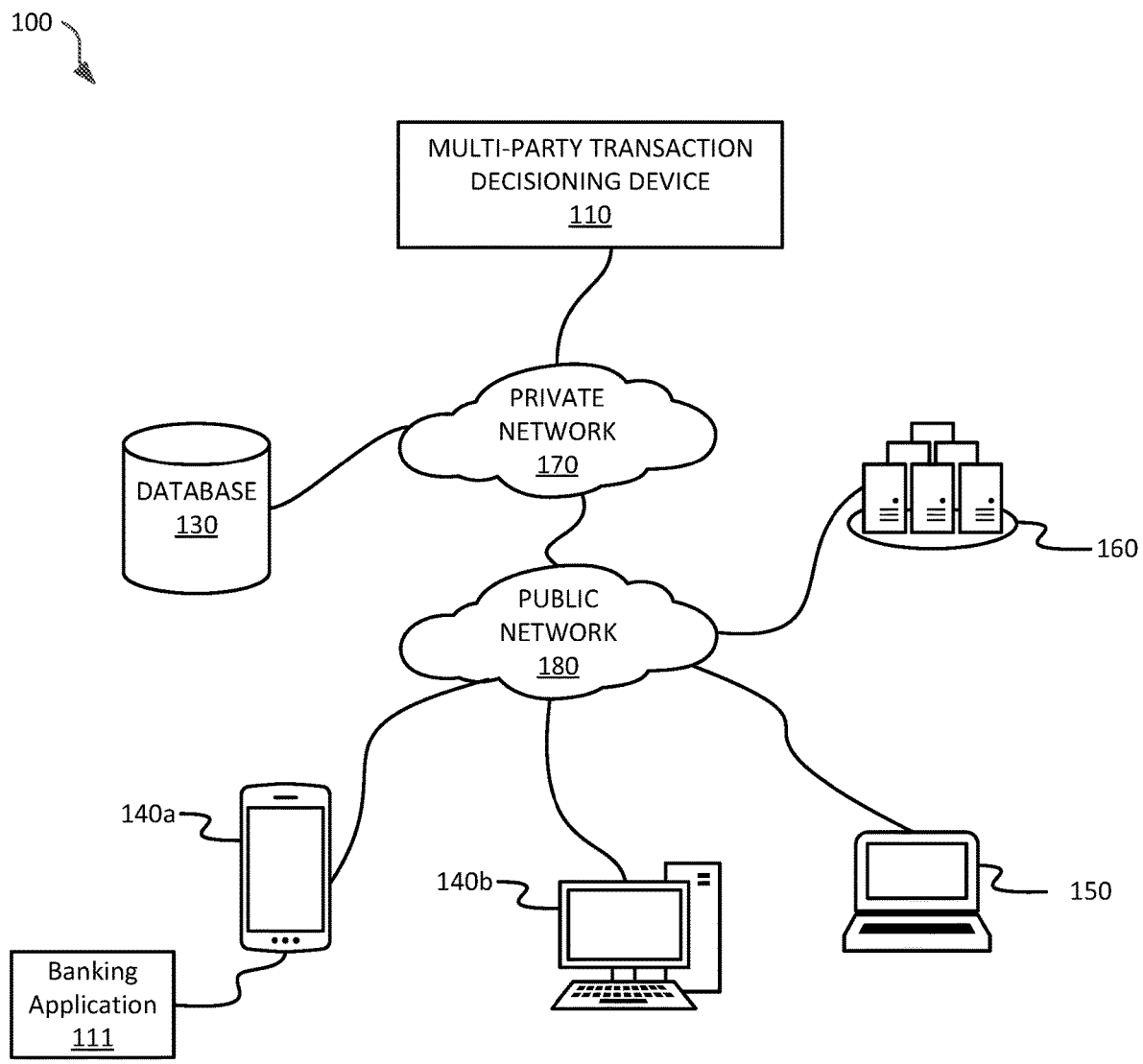
FIG. 1 is a diagram of an example computing environment for an automated multi-party transaction decisioning system, in accordance with one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Aspects described herein improve the functioning of computers by the development of a process by which shared or multi-party transactions may be identified or detected. Multi-party transactions may be those transactions in which some portion of the associated transaction amount should be shared between more than one party—for instance, as a shared expense. Current systems and applications are available to assist users with coordinating the sending of requests to multiple individuals for transactions manually identified by the user as multi-party transactions. These systems merely allow a user to identify a transaction and to indicate individuals to whom messages or notifications should be sent requesting that a portion of the value of the transaction be paid to the user. Existing processes can be time-consuming and prone to human error, particularly when multiple transactions require sharing—such as shared transactions incurred during an event with multiple individuals, such as a vacation. Current systems lack the ability to proactively identify, detect, and/or predict transactions that are likely multi-party transactions or to identify, detect, and/or predict events that may result in such multi-party transactions. Current systems also lack the ability to link payments received from others, in response to a request to share or split a transaction, with an original transaction at the source so that the requesting user is aware that the received payment is associated with a prior request to split a particular transaction. Current systems are unable to address these problems because such systems are generally third-party systems that do not source the transactions. These systems do not have access to the information or the data necessary to actively identify transactions that are potential multi-party transactions or to manage receipt of requested payments for such multi-party transactions by associating such received payments with their original counterpart transactions. When requested payments are received by such systems they are received as non-descript transactions with no means for identifying or associating the payments with an original transaction for which a request for payment was previously made. By providing computers with the ability to automatically identify potential multi-party transactions and/or multi-party events and to manage and link received requested payments for such with a corresponding original transaction, organizations may be able to seamlessly provide users with an efficient and convenient means of managing their shared expenses.

Aspects discussed herein may relate to methods, systems, devices, and computer-readable media for a multi-party transaction decisioning system.

Initially, a user may make a payment for a transaction shared with multiple individuals. The system may recognize that the transaction is atypical based on an amount of the transaction and what the user typically spends with the merchant associated with the transaction or with merchants of a similar type. Based on this recognition, the system may make a determination that the transaction is a candidate multi-party transaction, i.e., that the transaction is potentially associated with more than one party as a shared transaction or expense. The system may further attempt to identify the other parties that are potentially associated with the transaction by accessing, with the permission of the user, data associated with the user, such as email data, scheduling data, social media data, location data, or the like. The system may be able to identify potential parties to the transaction by analyzing the user's data. In some cases, the system may also be able to identify, from an analysis of the user's data, potential events that the user may be participating in with other individuals, such as travel identified by an emailed receipt of a travel itinerary. The system may determine, from the analyzed data or from information provided by the user, start and end dates associated with such events and may monitor transactions occurring during such time frames for candidate multi-party transactions. When candidate multi-party transactions are identified, the system may receive confirmation from the user that the identified transactions are indeed multi-party transaction and may determine an optimal payment scheme for payment between the identified parties. The system may facilitate a process of delegating, to the identified parties, portions of transaction amounts of such multi-party transactions determined based on the optimal payment scheme, and requesting payments from the identified parties. The system may further manage receipt of such payments in a manner that may allow the received payments to be linked to the associated multi-party transaction or the multi-party event.

Referring to FIG. 1, an example computing environment for an automated multi-party transaction decisioning system is provided. A multi-party transaction decisioning system 100 may include one or more systems or computing devices, such as a multi-party transaction decisioning device 110, a database 130, one or more user computing devices 140 (e.g., a first user computing device 140*a* and/or a second user computing device 140*b*), one or more delegate computing devices 150, a payment processing system 160, a private network 170, and a public network 180. Although the various systems and computing devices in the multi-party transaction decisioning system 100 are shown and described as separate devices, one or more of the systems/computing devices may be part of a single system/computing device without departing from the scope of the disclosure.

The multi-party transaction decisioning device 110 may be a computing device, such as a server, used by a banking institution or other financial institution to provide functionality associated with processing banking and/or credit card transactions; determining, detecting, predicting, and/or identifying transactions that may be associated with more than one party, such as transactions for expenses shared by multiple individuals; identifying parties to such shared or multi-party transactions; and delegating portions of the amounts of such multi-party transactions to the various identified parties.

The database 130 may store information used by the multi-party transaction decisioning device 110, the one or more user computing devices 140, the one or more delegate computing devices 150, and/or the payment processing system 160. The database 130 may comprise one or more of a relational database, a hierarchical database, a distributed database, an in-memory database, a flat file database, an XML database, a NoSQL database, a graph database, or the like.

The one or more user computing devices 140, e.g., the first user computing device 140*a* and/or the second user computing device 140*b*, may be configured to communicate with and/or connect to one or more computing devices of the multi-party transaction decisioning system 100 via the public network 180. In some instances, the one or more user computing devices 140 may have installed thereon one or more applications for performing one or more aspects described herein. For instance, the first user computing device 140*a* may store an application, such as the banking application 111, for accessing a bank account, credit card account, commercial account, line of credit, and/or the like. In some instances, the one or more user computing devices 140 may access one or more applications installed on the multi-party transaction decisioning device 110 for performing one or more aspects described herein. For instance, the second user computing device 140*b* may access, using a website and via the public network 180, the banking application 111 installed at the multi-party transaction decisioning device 110. In some instances, the multi-party transaction decisioning device 110 may be embodied in the one or more user computing devices 140.

The one or more user computing devices 140 may be any type of computing device or combination of devices capable of performing the particular functions disclosed herein. For example, the one or more user computing devices 140 may be and/or include server computers, desktop computers, laptop computers, tablet computers, smart phones, fitness devices, or the like that may include one or more processors, memories, communication interfaces, storage devices, and/or other components. The one or more user computing devices 140, in some instances, may be or include special-purpose computing devices configured to perform the functions disclosed herein. In some instances, some or all of the functionality of the multi-party transaction decisioning device 110 may instead be performed by any of the one or more user computing devices 140 alone or in combination with the multi-party transaction decisioning device 110.

The one or more user computing devices 140 may have integrated therein an image capturing device for capturing an image, such as a receipt image, or scanning a code, such as a bar code or a quick response (QR) code. For instance, the image capturing device may be one of one or more sensors of the one or more user computing devices 140, and one or more applications installed on the one or more user computing devices 140 may cause the image capturing device to be activated and to capture an image or scan a code. The captured image may be stored on the one or more user computing devices 140 and/or on a different device. In some cases, the image capturing device may be used to capture one or more images of a receipt for use in extracting line item data for a corresponding transaction. In some cases, the image capturing device may be used to scan a barcode, QR code, or the like displayed on a receipt to provide further information about the transactions provided on the receipt. In some cases, the one or more user computing devices 140 may use an image capturing device that is separately embodied from the one or more user computing devices 140. When separately embodied, the image capturing device may, in some cases, be communicatively connected to the one or more user computing devices 140 and may be controlled by the one or more user computing devices 140. In some instances, the image capturing device might not be connected to the one or more user computing devices 140. In some instances, the image capturing device may be communicatively connected to the public network 180 and may be configured to transmit images to the one or more user computing devices 140, the multi-party transaction decisioning device 110, and/or to other devices via the public network 180.

The one or more delegate computing devices 150 may be computing devices associated with users or delegates who receive a request for payment of a portion of a determined multi-party transaction. The one or more delegate computing devices 150 may be configured to communicate with and/or connect to one or more computing devices of the multi-party transaction decisioning system 100 via the public network 180. In some instances, the one or more delegate computing devices 150 may have installed thereon one or more applications for performing one or more aspects described herein. For instance, the one or more delegate computing devices 150 may store an application, such as the banking application 111, for accessing a bank account, credit card account, commercial account, line of credit, and/or the like. In some instances, the one or more delegate computing devices 150 may access one or more applications installed on the multi-party transaction decisioning device 110 for performing one or more aspects described herein. For instance, the one or more delegate computing devices 150 may access, using a website and via the public network 180, the banking application 111 installed at the multi-party transaction decisioning device 110. In some instances, the multi-party transaction decisioning device 110 may be embodied in the one or more delegate computing devices 150. The one or more delegate computing devices 150 may additionally have installed thereon, or may access via a website using the public network 180, one or more payment applications for making an electronic payment, such as PAYPAL, APPLE PAY, GOOGLE PAY, SAMSUNG PAY, ZELLE, VENMO, CASHAPP, or the like. The payment application may be used to make a payment of a requested amount to a user, in accordance with aspects described herein.

The payment processing system 160 may comprise one or more computing devices associated with a payment processing network of systems and devices associated with merchants, clearinghouses, financial institutions, and the like that interact with one another to process, authorize, and settle payment transactions, such as a credit card transaction or an Automated Clearing House (ACH) transaction. For instance, a credit card payment processing system may receive a request from a merchant point of sale system for authorization of a purchase transaction made with a credit card. The payment processing system 160 may send information associated with the purchase transaction to a system associated with the banking institution that issued the credit card. The banking institution system may execute one or more processes to make an authorization determination. For example, the banking institution system may assess potential fraud associated with the purchase transaction and may confirm the account holder has sufficient credit to cover the purchase amount. The banking institution system may send the authorization determination back to the payment processor system 160 for approval or denial of the purchase transaction. If approved, the payment processor system 160 may additionally coordinate payment from the credit card issuing bank and the merchant bank. In this case, the credit card issuing bank may receive the purchase transaction at a transaction server and/or database, such as the multi-party transaction decisioning device 110 or the database 130, and may perform one or more functions to cause the user's account to be credited for the transaction amount associated with the purchase transaction. Additionally, in the case of an electronic payment processing system, such as the ACH network, when a user authorizes an ACH payment to a merchant directly from the user's bank account, the merchant bank may send a request for payment to the payment processing system 160 and the payment processing system 160 may in turn send a request to the user's bank for the payment. The user's bank may confirm whether the user has sufficient funds to make the payment and, in this case the user's bank may receive and process the payment transaction, via a transaction server and/or database, such as the multi-party transaction decisioning device 110, and may perform one or more functions to cause the transaction amount to be debited from the user's bank account. The user's bank may further send a request to the payment processing system 160 to coordinate payment to the merchant bank.

The private network 170 may be a network operated by, and internal to, an organization or business, such as a banking institution. The private network 170 may be used to interconnect one or more computing devices internal to the organization or business. The private network 170 may further connect to the public network 180. The private network 170 may include one or more of local area networks (LANs), wide area networks (WANs), virtual private networks (VPNs), or the like.

The public network 180 may connect the private network 170, and/or the one or more computing devices connected thereto, to one or more networks, systems, and/or computing devices that might not be associated with the organization, such as the one or more user computing devices 140 or the one or more delegate computing devices 150. The public network 180 may include one or more networks, such as the Internet.

Figure 2:
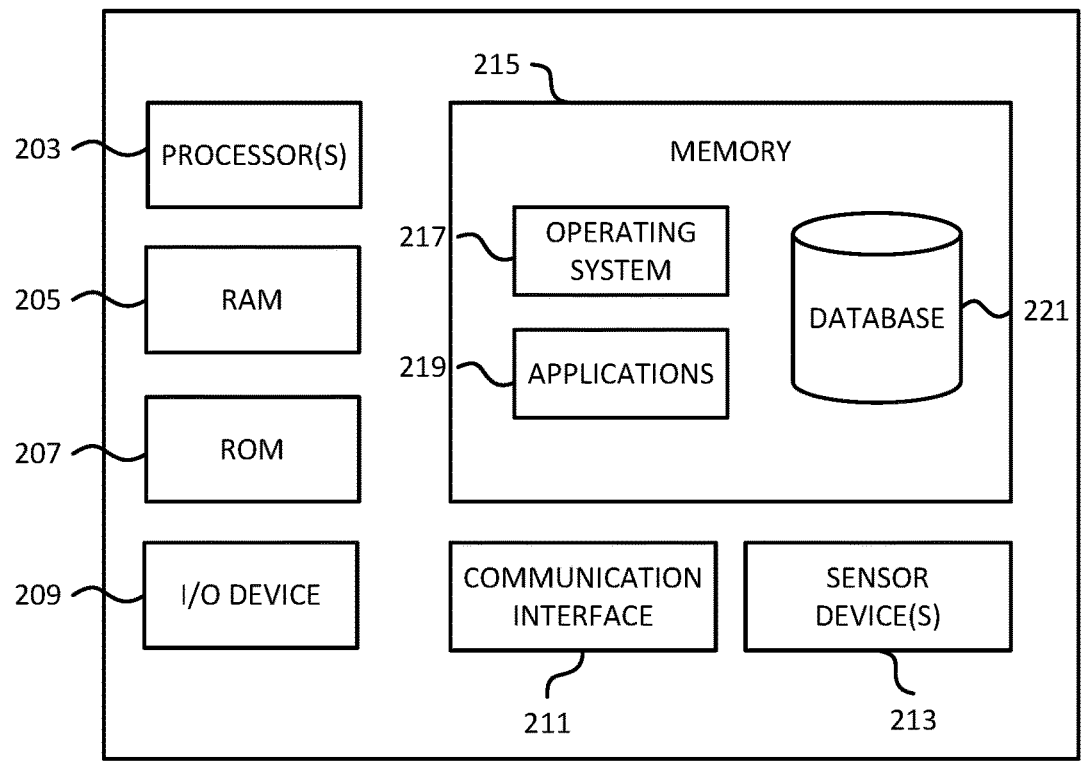
FIG. 2 is a diagram of an example hardware configuration of an example computing device used in an automated multi-party transaction decisioning system, in accordance with one or more aspects described herein.

Referring to FIG. 2, an example hardware configuration of an example computing device 200 is provided. The example computing device 200 may include or incorporate any one of the multi-party transaction decisioning device 110, the database 130, the one or more user computing devices 140, the one or more delegate computing devices 150, or the payment processing system 160. In some instances, the computing device 200 may represent, be incorporated in, and/or include various devices such as a desktop computer, a computer server, a mobile device, such as a laptop computer, a tablet computer, a smart phone, or any other types of mobile computing devices, and/or any other type of data processing device.

The computing device 200 may include one or more components, such as one or more processors 203, a random access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the memory 215, the I/O device 209, the communication interface 211, and/or the one or more sensor devices 211. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

The I/O device 209 may include, but need not be limited to, a microphone, keypad, touch screen, and/or stylus, through which a user of the computing device 200 may provide input, and may also include one or more of a speaker for providing audio output, and a video display device for providing textual, audiovisual, and/or graphical output.

The communication interface 211 may include one or more transceivers, digital signal processors, and/or additional circuitry and software for communicating via a network (e.g., the private network 170, the public network 180, or the like), wired or wireless, using any protocol as described herein.

The one or more sensor devices 213 may include one or more of an accelerometer, a gyroscope, a GPS device, a biometric sensor, a proximity sensor, an image capturing device, a magnetometer, etc.

The memory 215 may store software to provide instructions to the one or more processors 203 allowing the computing device 200 to perform various actions. For example, the memory 215 may store software used by the computing device 200, such as the operating system 217, applications 219, and/or the database 221. The various hardware memory units in the memory 215 may include volatile and nonvolatile, removable and non-removable media implemented in any method or technology for storage of information, such as computer-readable instructions, data structures, program modules, or other data. The memory 215 may include one or more physical persistent memory devices and/or one or more non-persistent memory devices. The memory 215 may include, but need not be limited to, the RAM 205, the ROM 207, electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the one or more processors 203.

Although various components of the computing device 200 are described separately, functionality of the various components may be combined and/or performed by a single component and/or multiple computing devices in communication without departing from the scope of the disclosure.

Figure 3:
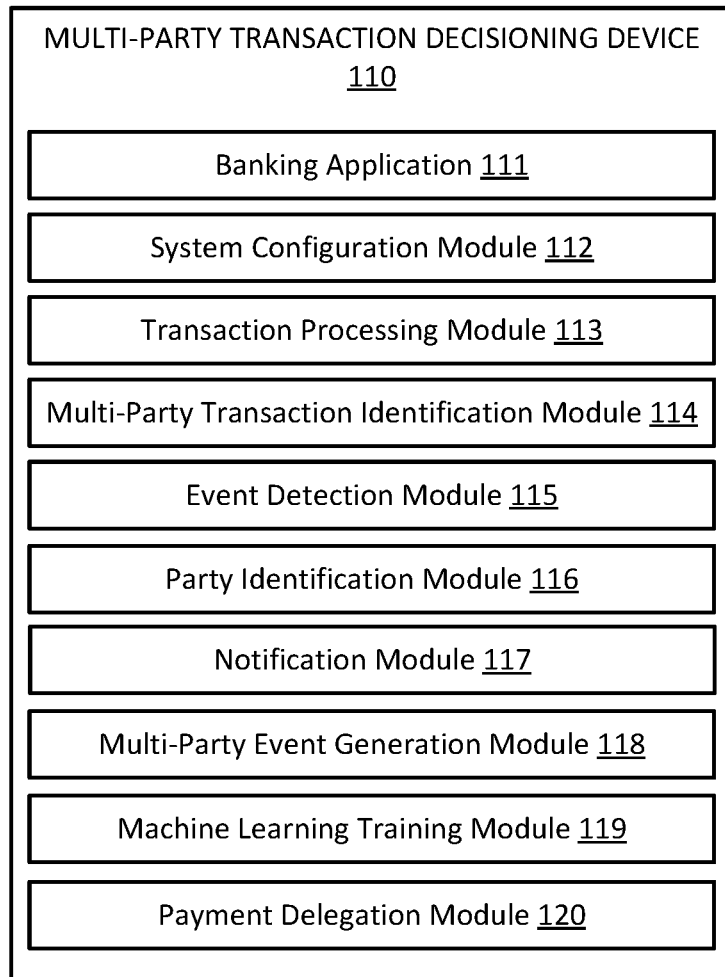
FIG. 3 is a diagram of example components of an example computing device used in an automated multi-party transaction decisioning system, in accordance with one or more aspects described herein.

Referring to FIG. 3, example components of an example computing device, such as the multi-party transaction decisioning device 110, used to perform various features in accordance with the multi-party transaction decisioning system 100 are provided.

The multi-party transaction decisioning device 110 may comprises one or more components, modules, and/or applications, such as a banking application 111, a system configuration module 112, a transaction processing module 113, a multi-party transaction identification module 114, an event detection module 115, a party identification module 116, a notification module 117, a multi-party event generation module 118, a machine learning training module 119, and a payment delegation module 120. In some instances, the multi-party transaction decisioning device 110 may comprise additional or different components, applications, and/or modules. Additionally, while the various components of the multi-party transaction decisioning device 110 are shown and described as separate components, in some cases, one or more of these components may be combined into a single component.

The banking application 111 may be an application stored and/or controlled by the multi-party transaction decisioning device 110. The banking application 111 may be associated with a transaction account belonging to the user and maintained by a banking institution—such as the user's bank account, credit card account, commercial account, line of credit, or the like, and may be used to provide the user with online access to the user's account(s). The banking application 111 may be used by the user to perform various account-related functions, such as viewing account transactions, making payments, depositing checks, transferring funds, sending funds, etc. Additionally or alternatively, the banking application 111 may be used to perform functions associated with the management of multi-party transactions and events and the sharing or delegation of multi-party transactions. As will be described below in further detail, the banking application 111 may generate and display one of more user interfaces to facilitate these functions. The banking application 111 may be a server-based application installed and executed at the multi-party transaction decisioning device 110. The server-based banking application 111 may be accessed through a website, such as a banking website, by a client device, such as by the second user computing devices 140b. Additionally or alternatively, the banking application 111 may be a client-based application installed and executed on a client device, such as the first user computing device 140a or the one or more delegate computing devices 150.

The system configuration module 112 may be used by the multi-party transaction decisioning device 110 to configure one or more aspects of the multi-party transaction decisioning system 100. The multi-party transaction decisioning device 110 may cause the system configuration module 112 to download and/or install the banking application 111 to the one or more user computing devices 140, upon request by a user. For instance, the user may make a request, via an online app store or a website, to download the banking application 111 to the first user computing device 140a. In this case, the device 110 may control the system configuration module 112 to download the banking application 111 to the first user computing device 140a. Once downloaded, the system configuration module 112 may generate and output one or more user interfaces, via the banking application 111, for configuring the multi-party transaction decisioning system 100. While reference is made to the first user computing device 140a here and throughout the description, such reference is for convenience of description only and any of the one or more user computing devices 140 may be interchangeably used.

The one or more user interface generated and output by the system configuration module 112 may provide options for the user to provide certain permissions to the multi-party transaction decisioning system 100 and/or to set certain user preferences for use by the multi-party transaction decisioning system 100. For instance, the user interface may provide options for the user to provide permission for the multi-party transaction decisioning system 100 to access certain data and/or applications installed and/or operating on the user computing device 140a or certain data stored at another device and associated with the user.

For instance, the one or more user interfaces may provide options for the user to provide permission for the multi-party transaction decisioning system 100 to access, track, monitor, and/or collect data associated with the user's banking and/or credit card transactions—such as transactions associated with the user's bank and/or credit card accounts. Access to the user's banking transaction may be used to identify candidate multi-party transactions.

The one or more user interfaces may additionally provide options for the user to provide permission for the multi-party transaction decisioning system 100 to access, monitor, and/ or collect data associated with the user's email applications, calendar applications, social media/networking applications, contacts applications, or the like. Access to such data may be used by the multi-party transaction decisioning system 100 to identify when the user is anticipated to attend an event— such as a family gathering, a business conference, a sporting event, or the like. Access to such data may also be used by the multi-party transaction decisioning system 100 to identify potential friends, associates, or others who may be participating in the identified event with the user.

The one or more user interfaces may additionally provide an option for the user to provide permission for the multi-party transaction decisioning system 100 to access, monitor, and/or collect location information associated with the user computing device 140a, such as GPS data, Wi-Fi data, and/or cellular data, in order to identify a location of the user. Access to such data may be used by the multi-party transaction decisioning system 100 to determine if the user may be located in a vicinity of an identified event. In some cases, the accessed data may be used to determine if the user is potentially a party to a shared transaction of another user. For instance, if the location data indicates that two users may be co-located, the multi-party transaction decisioning system 100 may make certain predictions regarding potential parties to a transaction occurring around that time.

The one or more user interfaces may additionally provide options for the user to provide user preferences for use by the multi-party transaction decisioning system 100. For instance, the user preferences may include the identification of specific bank, credit card accounts, email accounts, social media/networking accounts, etc. that may be tracked or monitored by the multi-party transaction decisioning system 100. The user preferences may additionally include types or categories of transactions that the multi-party transaction decisioning system 100 may consider as candidate multi-party transactions. The user preferences may further include minimum and/or maximum transaction amounts that may qualify as candidate multi-party transactions. The user preferences may further include identification of certain individuals who should be excluded from consideration as potential parties to multi-party transactions. The individuals may be identified by name and/or contact information, such as an email address, a phone number, a social media handle, or the like. For instance, the user may not wish to include a parent, a spouse, or a business client as a potential party to a multi-party transaction.

The user preferences may further include information identifying times for presenting or not presenting notifications to the user and/or the manner in which notifications should be provided, e.g. via the banking application 111, email, text message, etc.

The one or more user interfaces may provide additional options for configuring the multi-party transaction decisioning system 100. The system configuration module 112 may cause information collected during the system configuration process to be stored in the database 130 and/or in a memory associated with the first user computing device 140a.

The transaction processing module 113 may be used by the multi-party transaction decisioning device 110 to provide transaction processing functionality associated with the user's transaction account, such as the user's bank account, credit card account, commercial account, line of credit, or the like. The transaction processing module 113 may control transaction processing functions, such as deposits made to the account, payments made from at the account, credits and/or debits to the account, transferring funds between accounts and/or banks, or the like. For instance, when the user makes a purchase from a merchant using, for example, his debit card or a credit card or via an Automated Clearinghouse (ACH) transaction, a payment processing system, such as the payment processing system 160, may be used to coordinate settlement between the user's bank and the merchant's bank. Once settled, the payment processing system 160 may send information associated with the settled purchase transaction to the user's hank for internal processing by, for example, the transaction processing module 113 of the multi-party transaction decisioning device 110. The transaction processing module 113 may perform one or more functions to cause the funds associated with the transaction to be debited from the user's bank account. The transaction processing module 113 may further cause the transaction to be stored in the database 130.

The multi-party transaction identification module 114 may be used by the multi-party transaction decisioning device 110 to determine, detect, identify, or predict whether a transaction processed by the transaction processing module 113 is likely a multi-party transaction, e.g., a transaction associated with more than one party, such as for a shared expense. The multi-party transaction identification module 114 may employ a machine learning model to make such determinations, detections, identifications, or predictions. The determination may be made based on an amount associated with the transaction, a spend profile associated with the user, and/or a merchant profile associated with a merchant associated with the transaction. The spend profile may include information associated with the user's historical transactions and patterns of spending with different merchants, types of merchants, or classes of merchants; at different times of the day, month, year, etc.; in different geographical locations; for various types or categories of goods or services; and/or the like. The merchant profile may include information identifying the type or category (e.g., restaurant, hotel, rideshare, airline, sporting venue, movie theater, etc.) or class (e.g., 5 star, family-friendly, budget, luxury, etc.) of the merchant; a geographical location of the merchant; an average, mean, range, etc. of prices associated with the merchant's goods or services; an average, mean, range, etc. of amounts customers spend with the merchant. The prices and/or spend amounts may be broken down based time of data, month, year; demographics of consumers; the number of consumers associated with a particular transaction, etc.

For instance, the multi-party transaction identification module 114 may employ the machine learning model to identify or detect that a transaction is atypical for the user when there is a spike or an increase above a threshold percentage or a threshold amount in a transaction amount, relative to what the user typically spends, as indicted by the user's spend profile, with the merchant or with similar merchants of the same category/type (e.g., restaurant, hotel, rideshare, airline, sporting venue, movie theater, etc.) or class (e.g., 5 star, family-friendly, budget, luxury, etc.), as indicated by the merchant profile; or relative to what other individuals typically spend with the merchant as indicated by the merchant profile. Such atypical transactions may be determined to be candidate multi-party transactions—transactions representing an expense potentially shared by more than one party. In some cases, the multi-party transaction identification module 114 may identify, determine, or predict that a transaction is a multi-party transaction based on a determination that the transaction is associated with an event in which the user is participating, attending, or otherwise involved in with one or more other individuals. In some cases, the multi-party transaction identification module 114 may identify, determine, or predict that a transaction is a multi-party transaction based on a determination that the transaction occurs during a time period associated with an event in which the user is participating. For instance, the multi-party transaction identification module 114 may determine that all transactions, or transactions of a certain type or category, occurring while a user is attending an event, such as a business conference, a vacation, a sporting event, or the like, may be candidate multi-party transactions. Alternatively, the multi-party transaction identification module 114 may determine that only atypical transactions, determined in the manner described above, occurring while the user is participating in the event qualify as candidate multi-party transactions.

The event detection module 115 may be used by the multi-party transaction decisioning device 110 to detect a potential event in which it is anticipated that the user may participate or is determined that the user is currently participating. For instance, the event detection module 115 may monitor and/or analyze one or more of the user's banking or credit card transactions, email accounts, electronic calendars, location data, and/or social media data and may determine that the user made a purchase associated with a potential event, such as the purchase of an airline ticket. By way of example, the event detection module 115 may detect a transaction where the merchant is an airline company. The event detection module 115 may additionally monitor the user's email account and detect, based on using a script to scan the user's emails for certain keywords such as "airline ticket" or "airline travel" or the like, an email with an airline ticket receipt and/or itinerary. The script may further be used to scan the airline ticket receipt for the user's name to ensure that the airline ticket is for the user, and not someone else the user purchased the ticket on behalf of. The script may further be used to detect travel dates and locations associated with the airline ticket. In some cases, the event detection module 115 may use the script to scan calendar data or social media data for certain keywords to determine travel dates and locations associated with airline travel. In some cases the event detection module 115 may use just a single data point, such as an email including an airline ticket receipt, to determine whether a user may participate in a potential event. In other cases, the event detection module 115 may use multiple data points to make such determinations. For instance, the event detection module 115 may use an email including an airline ticket receipt along with location data from the user's device, such as the user computing device 140a. The location data may be used to confirm that the user is at or is in a vicinity of a location associated with a determined potential event on the corresponding date. Additionally, in some cases, the location data may be used alone to determine when the user may be located in a geographical location outside of the user's home geographical location. For instance, when the user is determined to be located more than a threshold distance from the user's home geographical location, the event detection module 115 may predict that the user is travelling and may identify such travel as a potential event.

The detection of potential events need not be limited to events associated with airline travel, but may additionally include events associated with train or bus travel, a cruise, a rideshare, a sporting event, a family gathering, lunch with co-workers, a business conference, being in a location outside of a home geographical location, etc. The detection of potential events may be associated with any activity that may potentially be performed by multiple people.

The party identification module 116 may be used by the multi-party transaction decisioning device 110 to identify parties associated with an identified candidate multi-party transaction or parties associated with an identified potential event. For instance, after detection of a candidate multi-party transaction by the multi-party transaction identification module 114, the party identification module 116 may employ a script to scan the user's email accounts, electronic calendars, and/or social media data to determine other individuals potentially associated with the candidate multi-party transaction. For instance, if an atypical transaction is detected in the manner described above, such as for the purchase of tickets for a baseball game, and determined to be a candidate multi-party transaction, the party identification module 116 may employ a script to scan the user's email accounts, electronic calendars, and/or social media data to identify corresponding data mentioning or providing an indication of a baseball game, such as electronic calendar data having a scheduling entry indicating "baseball game with John Smith and Bobby Jones." In this case, the party identification module 116 may identify John Smith and Bobby Jones as potential parties to the candidate multi-party transaction.

As another example, after detection of a potential event by the event detection module 115 by monitoring and/or analyzing the user's banking or credit card transactions, email accounts, electronic calendars, social media data, and/or location media data, the party identification module 116 may continue with the analysis by attempting to identify parties associated with the event using the same, or in some cases different data, used to identify the event. For example, following through with the example above regarding identifying an event the user is anticipated to participate in based on detecting an airline ticket receipt in the user's email, the party identification module 116 may employ a script to scan the airline ticket receipt for the names of other individuals included on the airline ticket receipt. In this case, the party identification module 116 may identify such individuals as potential parties to the potential event. The party identification module 116 may exclude certain individuals as potential parties based on the system configuration data.

In some cases, the party identification module 116 may identify parties associated with the identified candidate multi-party transactions or the potential events, by monitoring or analyzing the transaction data, or other data such as email accounts, social media data, calendar data, location data, etc., of other users to identify transactions that may be related to the multi-party transaction. For example, if the candidate multi-party transaction is a purchase at The Best Bar on Main Street on May 1$^{st}$ at 7 pm, the party identification module 116 may identify contacts or friends of the user by accessing the user's social media data, such as friends lists, or by accessing the user's contacts data. The party identification module 116 may then monitor and/or analyze the transactions of those contacts or friends also participating in the multi-party transaction decisioning system 100 and who have provided permission for such monitoring. In analyzing the transactions of the user's contacts/friends, the party identification module 116 may search for one or more transactions occurring on or about the same date and time as the multi-party transaction and/or associated with a merchant in a vicinity of the merchant associated with the multi-party transaction. Upon detecting such transactions, the party identification module 116 may determine that the contact/friend is a potential party to the multi-party transaction. By way of example, the party identification module 116 may identify that the user's FACEBOOK friend Jane Williams has a purchase transaction for an UBER ride made on May 1$^{st}$ at or around 7 pm. In some cases, the party identification module 116 may further access the friend's email, where the friend has provided such permission, and employ a script to identify a receipt for the UBER ride. The party identification module 116, using the script, may scan the receipt for a destination associated with the UBER ride and may determine that the destination is in a vicinity of The Best Bar on Main Street. In some cases and where the friend has provided such permission, the party identification module 116 may further access the friend's location data on the friend's device and may determine that the location data indicates that the friend was located in a vicinity of The Best Bar on Main Street on May 1$^{st}$ at or around 7 pm. Since, Jane appears to have been in the vicinity of the location associated with the candidate multi-party transaction, e.g., The Best Bar, the party identification module 116 may identify Jane as a potential party to the multi-party transaction. Accordingly, by accessing and monitoring the data of other individual's associated with the user the party identification module 116 may identify potential parties associated with the user's candidate multi-party transaction or with a potential event in which the user is participating.

The notification module 117 may be used by the multi-party transaction decisioning device 110 to send a notification to a user when a transaction is identified as a candidate multi-party transaction, when a potential event is detected, and/or when potential parties associated with the candidate multi-party transaction or the potential event are identified. For instance, when the multi-party transaction identification module 114 identifies a transaction as a candidate multi-party transaction, the notification module 117 may send a message to the user requesting confirmation that the transaction is actually a multi-party transaction. If the user confirms that the candidate multi-party transaction is indeed a multi-party transaction, the multi-party transaction decisioning device 110 may control the multi-party transaction identification module 114 to tag the transaction as a multi-party transaction. If the user, instead, indicates that the candidate multi-party transaction is not a multi-party transaction, the multi-party transaction decisioning device 110 may control the multi-party transaction identification module 114 to tag the transaction as an individual transaction. Tagging the transaction as a multi-party transaction or an individual transaction may involve the multi-party transaction identification module 114 storing, in the database 130 together with the transaction, an indication that the transaction is a multi-party transaction or an individual transaction. In some cases, the indication that the transaction is a multi-party transaction may additionally or alternatively be stored in a memory associated with the user computing device 140a.

Additionally, upon confirmation that the candidate multi-party transaction is actually a multi-party transaction, the notification module 117 may request a confirmation from the user regarding whether any potential parties identified by the party identification module 116 are actual parties to the multi-party transaction. If the user confirms that one or more of the identified potential parties are indeed parties to the multi-party transaction, the multi-party transaction decisioning device 110 may control the party identification module 116 to store, in the database 130 together with the transaction, information identifying the parties associated with the multi-party transaction. In some cases, the information identifying the parties associated with the multi-party transaction may additionally or alternatively be stored in a memory associated with the user computing device 140a. Further, upon confirmation that one or more of the identified potential parties are indeed parties to the multi-party transaction, the notification module 117 may send a notification to the identified parties to notify the individuals that they have been identified as parties to a particular multi-party transaction.

Additionally, when the event detection module 115 detects a potential event, the notification module 117 may send a message to the user requesting confirmation that the detected potential event is actually a multi-party event. Upon confirmation that the potential event is an actual multi-party event, the notification module 117 may request further confirmation regard whether a multi-party event should be created in the multi-party transaction decisioning system 100 for tracking transactions associated with the identified event. If the user confirms that the multi-party event should be created in the multi-party transaction decisioning system 100, the multi-party transaction decisioning device 110 may control the multi-party event generation module 118 to generate and store, in the database 130 and/or in a memory associated with the user computing device 140a, a new multi-party event (described in further detail below). If the user indicates that the potential event is not a multi-party event or is a multi-party event but should not be created as such in the multi-party transaction decisioning system 100, the multi-party transaction decisioning device 110 may ignore the detected potential event.

Additionally, upon confirmation that the potential event is a multi-party event, the notification module 117 may be used to request confirmation from to user regarding whether any potential parties identified by the party identification module 116 are actual parties to the multi-party event. If the user confirms that one or more of the identified potential parties are indeed parties to the multi-party event, the multi-party transaction decisioning device 110 may control the party identification module 116 to store, in the database 130 and/or in a memory associated with the user computing device 140a, together with the multi-party event, information identifying the parties associated with the multi-party event. Further, upon confirmation that one or more of the identified potential parties are indeed parties to the multi-party event, the notification module 117 may send a notification to the identified parties to notify the individuals that they have been identified as parties to a particular multi-party event. In some cases, the notification module 117 may further send a notification to the identified parties requesting whether the individuals would like to associate or share their own transactions associated with the event with the multi-party event created by the user in the multi-party transaction decisioning system 100.

The notifications module 117 may cause the described notifications to be output to a user interface of the banking application 111. Additionally or alternatively, the notification module 117 may cause the described notifications to be sent via email or a text message to the user or the parties identified as associated with the multi-party transaction or multi-party event.

The multi-party event generation module 118 may be used by the multi-party transaction decisioning device 110 to generate a new multi-party event in the multi-party transaction decisioning system 100. For instance, as described above, if the event detection module 115 detects a potential event and the user confirms that potential event is a multi-party event that should be created in the multi-party transaction decisioning system 100, the multi-party transaction decisioning device 110 may control the multi-party event generation module 118 to generate and store a new multi-party event in the database 130 and/or in a memory associated with the user computing device 140a. The multi-party event generation module 118 may output a user interface for the user to input a name and/or description associated with the multi-party event, a start and end date associated with the multi-party event, types of transactions/merchants to be associated with the event, or the like. In some cases, the user interface may include an option for inputting a location to be associated with the multi-party event. Such location information, in some cases, may be pre-populated in the user interface based on location information detected by the event detection module 115, as described above. The multi-party event generation module 118 may further pre-populate the user interface with information identifying any potential parties, identified by the party identification module 116 and confirmed by the user, as being associated with the multi-party event. The user interface may further provide prompts for the user to enter information identifying any additional parties associated with the multi-party event. The user interface may provide prompts for the user to indicate the share or percentage of the event transaction amounts that should be associated with each party of the multi-party event. In some cases, the user interface may provide a link to send a join request to the additional parties to join the multi-party event and to share/associate, with the generated multi-party event, their own transactions occurring during a time period associated with the multi-party event. In this case, the multi-party transaction decisioning device 110 may control the notification module 117 to send the additional parties a notification to join the group.

The multi-party event generation module 118 may automatically identify and pre-populate the user interface with contact information, such as an email address, a phone number, a social media handle, etc., associated with the identified parties using the user's contact data, social media data or the like. Alternatively or additionally, the multi-party event generation module 118 may provide the user with prompts to manually enter or import contact information for the identified parties or to manually link the identified parties with corresponding contact information stored at the user's device, such as the user computing device 140a.

In addition to generating multi-party events based on the automatic detection of potential events by the event detection module 115, the multi-party generation module 118 may output a user interface that allows a user to manually enter a multi-party event. In this case, the user may manually enter event-related information similar to that described above, such as an event name, an event description, event start and end dates, parties associated with the event, and the like. The information associated with the generated multi-party event may be stored in the database 130 and/or in a memory associated with the user computing device 140.

An indication of the multi-party transactions occurring during the start and end dates of the multi-party event may be stored with the multi-party event in the database 130 and/or in a memory associated with the user computing device 140a. For instance, when the multi-party transaction identification module 114 identifies a candidate multi-party transaction, in the manner described above, that occurs during the start and end dates identified for the multi-party event and/or at a location identified for the multi-party event, the multi-party generation module 118 may cause such transaction to be linked with or otherwise indicated as being associated with the corresponding multi-party event. In some cases, where the identified parties to the multi-party event have agreed to share/associate their own transactions with multi-party event, the multi-party generation module 118 may also link or otherwise indicate the transactions of the other parties as being associated with the corresponding multi-party event. In some cases, at the end date, the notification module 117 may send the user a notification indicating that the event has ended and requesting whether the user wishes settle up the transactions associated with the multi-party event. In this way, transactions from various parties to the event may be grouped or identified together in a single location for convenience in settling up shared expenses at the conclusion of the multi-party event.

The machine learning module 119 may be used by the multi-party transaction decisioning device 110 to train one or more machine learning models and/or algorithms used for identifying multi-party transactions. The multi-party transaction decisioning device 110 may use various machine learning models and/or algorithms, such as, but not limited to, supervised learning algorithms, unsupervised learning algorithms, regression algorithms (e.g., linear regression, logistic regression, etc.), instance based algorithms (e.g., learning vector quantization, locally weighted learning, etc.), regularization algorithms (e.g., ridge regression, least-angle regression, etc.), decision tree algorithms, Bayesian algorithms, clustering algorithms, artificial neural network algorithms, classification algorithms, ranking algorithms, etc.

The machine learning module 119 may train the machine learning models using one or more training datasets generated by the machine learning training module 119. The training datasets may include labeled data. For example, the machine learning training module 119 may generate a dataset in which information associated with a transaction identified as a candidate multi-party transaction is labeled with whether or not the user confirmed the candidate multi-party transaction as an actual multi-party transaction. The machine learning training module 119 may input the training dataset into the machine learning model to train the model to make predications related to whether a detected transaction is a multi-party transaction.

For instance, as discussed above, the user may be requested to confirm that a candidate multi-party transaction is indeed a multi-party transaction and the multi-party transaction identification module 114 may tag the transaction accordingly as a either a multi-party transaction or an individual transaction. The machine learning training module 119 may generate a training dataset based on such tagged transactions. The training dataset may include a record for each of the tagged transactions that includes information associated with the transaction and a corresponding label—e.g., "multi-party" or "individual." The information associated with the transaction in the training dataset may include an amount of the transaction, a date and time associated with the transaction, a merchant associated with the transaction, a type of merchant (e.g., restaurant, hotel, rideshare, airline, etc.), a class of merchant (e.g., 5 star, family-friendly, budget, etc.), a geographical location of the merchant, a number of parties identified as being associated with the transaction, or the like.

The machine learning training module 119 may input the training dataset into the machine learning model to train the model to make predications related to whether a transaction is likely a multi-party transaction. For instance, the machine learning model may utilize the training datasets to identify patterns, sequences, and/or relationships in the training data sets, so as to train the model to make predictions about whether a transaction is likely to be one associated with more than one party. The machine learning models may subsequently receive as input, unlabeled information associated with a newly detected transaction, and may output a tag indicating whether the detected transaction is likely to be a multi-party transaction. Such likely multi-party transactions may be considered as candidate multi-party transactions.

For instance, to determine whether new or untagged transactions of a particular category/type, as indicated in the user preferences, or new or untagged transactions occurring during a generated event may be candidate multi-party transactions, the multi-party transaction identification module 114 may input an unlabeled dataset of such transactions into the machine learning model. The unlabeled dataset may include a record for each untagged transaction that includes information associated with the transaction. The information associated with the transaction in the unlabeled dataset may include an amount of the transaction, a date and time associated with the transaction, a merchant associated with the transaction, a type of merchant, a class of merchant, a geographical location of the merchant, or the like. The machine learning model may receive the information associated with the unlabeled transaction and may output a prediction of whether the transaction is a multi-party transaction or an individual transaction. In some instances, the machine learning model may further output a confidence score or level associated with the prediction, which may indicate a degree of confidence in the predication. The confidence score may be a numeric value or may be an indication such as high, medium, low, etc. or may be represented in a different way. The multi-party transaction identification module 114 may determine whether or not to consider the transaction a candidate multi-party transaction based on the prediction and/or the confidence score output by the machine learning model.

The machine learning training module 119 may generate additional training datasets to input to the machine learning models to train the models to make other predictions or to recognize other data for use in performing the features of the multi-party transaction decisioning system 100. For example, the machine learning models may be trained with a training dataset of labeled social media data, scheduling data, email data, etc. to train the model to recognize language that may be indicative of potential events the user may participate in. The machine learning models may additionally be trained with a training dataset of labeled purchase receipt/invoice images and/or receipt/invoice layouts to train the model to recognize and extract various elements of an unlabeled purchase receipt/invoice input into the model, such as line item purchase details. This may allow a user to upload a receipt associated with a multi-party transaction so that the various individual line item details associated with the transaction may be extracted for facilitating delegation of portions of the multi-party transaction to individual parties.

The payment delegation module 119 may be used by the multi-party transaction decisioning device 110 to provide functionality associated with coordinating splitting, sharing, and/or delegating requests for payment of portions of a determined multi-party transaction to identified parties associated with the multi-party transaction and linking received delegate payments from such parties with an original delegated multi-party transaction.

FIGS. 4-7 are flowcharts of example methods of performing automated multi-party transaction decisioning functions, in accordance with one or more aspects described herein. The example methods are described as being performed by the multi-party transaction decisioning device 110 embodied in the user computing device 140a, however, the multi-party transaction decisioning device 110 may be embodied in a different device, such as the user computing device 140b or the one or more delegate computing devices 150, and the example methods may be performed by any one of the devices, alone or in combination.

Figure 4:
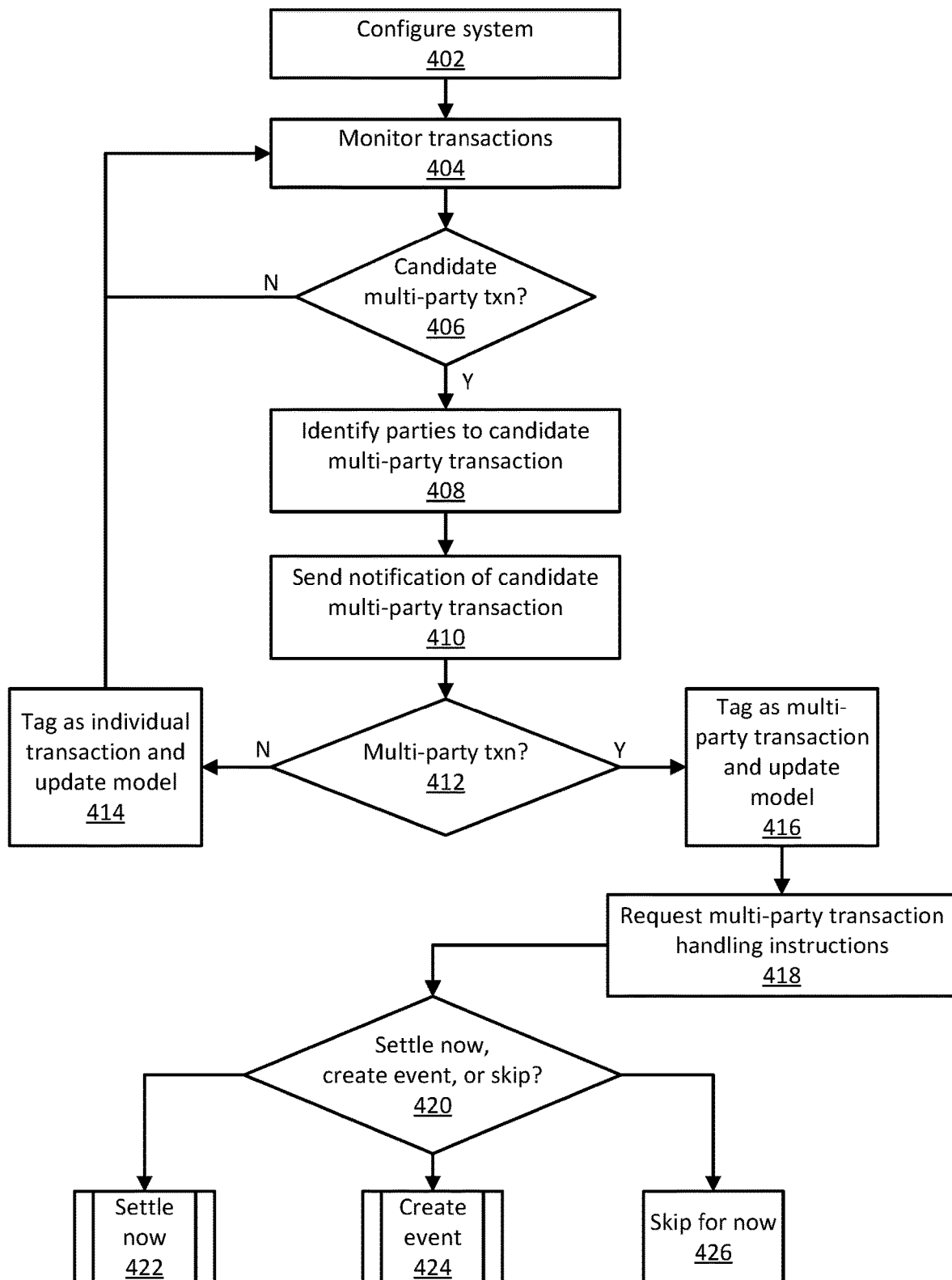
FIGS. 4-8 are flowcharts of example methods of performing automated multi-party transaction decisioning functions, in accordance with one or more aspects described herein.

Referring to FIG. 4, an example method for automatically detecting a multi-party transaction is provided.

At step 402, the user computing device 140a, operating as the multi-party transaction decisioning device 110, may receive a request to configure the user computing device 140a with the multi-party transaction decisioning system 100. In response to the request, the system configuration module 111 may control an application that provides computer-executable instructions for performing multi-party transaction decisioning functions to be downloaded and installed to the user computing device 140a. For instance, the system configuration module 112 may cause the banking application 111 to be downloaded and installed to the user computing device 140a. The system configuration module 112 may cause the banking application 111 to display a user interface for configuring the multi-party transaction decisioning system 100. The user interface may provide options for the user to provide certain permissions to the multi-party transaction decisioning system 100 and for the user to set certain user preferences for use by the multi-party transaction decisioning system 100.

For instance, the user interface may provide options for the user to provide permission for the multi-party transaction decisioning system 100 to access certain data and/or applications installed and/or operating on the user computing device 140 or another device associated with the user or an account of the user. For instance, the user interface may provide options for the user to provide permission for the multi-party transaction decisioning system 100 to access the user's banking transactions. The user interface may additionally provide options for the user to provide permission for the multi-party transaction decisioning system 100 to access the user's email applications/data, calendar applications/data, social networking applications/data, contacts applications/data, or the like. The user interface may additionally provide an option for the user to provide permission for the multi-party transaction decisioning system 100 to access location information associated with the user computing device 140a, such as GPS data, Wi-Fi data, and/or cellular data, in order to identify a location of the user. The user interface may additionally provide options for the user to provide user preferences for use by the multi-party transaction decisioning system 100. The user preferences may include types or categories of transactions the multi-party transaction decisioning system 100 may consider as potential multi-party transactions—such as transactions associated with airline or train ticket purchases, hotel accommodation purchases, rideshare purchases, the purchase of tickets for sporting events, or the movies, or other forms of entertainment, or the like. The user preferences may further include minimum and/or maximum transaction amounts that should be considered as potential multi-party transactions. The user preferences may include identification of certain individuals who should be excluded from consideration as potential parties to a multi-party transactions. The user preferences may include information indicating when and how notifications should be provided.

By way of example, a user, John Smith, may download the banking application 111 to his smartphone and provide input to configure the multi-party transaction decisioning system 100 to operate on the smartphone. The user may configure the system to monitor the user's banking account for potential multi-party transactions. The user may specify, via the user preferences, that only transactions from merchants that are restaurants should be considered and only those where the transaction amount is greater than $25 and where the transaction is not one shared with only the user's wife, Ellen Smith. The user may specify that notifications regarding potential multi-party transactions should only be provided after 5 pm and should be provided in both the banking application 111 and by text message to the telephone number associated with the user's smartphone.

After the user provides inputs for configuring the multi-party transaction decisioning system 100, the user computing device 140 may save the corresponding user configuration data to the database 130 and/or to a memory associated with the user computing device 140.

At step 404, after the user computing device 140a has been configured with multi-party transaction decisioning system 100, the multi-party transaction identification module 114 may begin to monitor for transactions that may potentially be associated with more than one party. For instance, as the user makes purchases using his banking account, the transaction processing module 113 may process the transactions to debit the user's bank for the corresponding transaction amounts and may record the transactions in the database 130. As new transactions are received and recorded, the multi-transaction identification module 114 may determine, based on the user configuration data, whether the transaction qualifies as one of the types of transactions that should be analyzed for consideration as a possible multi-party transaction. For instance, the multi-transaction identification module 114 may confirm that the new transaction is associated with a type of merchant specified in the user configuration data for monitoring. If the transaction qualifies as one that should be monitored and analyzed for consideration as a possible multi-party transaction, the multi-party transaction identification module 114 may employ a machine learning model to detect, identify, or predict whether the received transaction is a multi-party transaction. For instance, the multi-transaction identification module 114 may cause information associated with the transaction such as, an amount of the transaction, a date and time associated with the transaction, a merchant associated with the transaction, a type of merchant, a class of merchant, and/or a geographical location of the merchant, to be input into the machine learning model. The machine learning model may use the transaction information, along with a spend profile associated with the user, and a merchant profile associated with the merchant, to determine whether the transaction amount is atypical for the user. The transaction amount may be determined to be atypical for the user when there is a spike or an increase above a threshold percentage or amount in a transaction amount, relative to what the user typically spends, as indicted by the user's spend profile, with the merchant or with similar merchants of the same category/type or class or what other individuals typically spend with the merchant, as indicated by the merchant profile. If the machine learning model determines that the transaction is atypical for the user, the machine learning model may output a prediction that the transaction is likely a multi-party transaction. In some instances, the machine learning model may further output a confidence score associated with the prediction. The confidence score may indicate a degree of confidence in the predication.

The degree of confidence in the prediction and/or the confidence score may be based on the amount of information, or information related to the transaction, provided by the user's spend profile and/or the merchant profile. For instance, if little is known about the user's spending history as reflected by the spend profile, of if little is known about the user's spending as it relates to a particular category/type of merchant, or a particular category/type of goods or services, the degree of confidence in the prediction and/or the confidence score may be lower than if more information, or more related information, is available in the user's spend profile. Accordingly, the degree of confidence may be determined based on comparing an amount of information, or related information, in the user's spend profile with one or more threshold values. Likewise, the degree of confidence in the prediction and/or the confidence score may, additionally or alternatively, be based on the amount of information, or related information, provided by the merchant profile. For instance, if little is known about prices of the merchant's goods/services or how much a consumer spends on average with the merchant, the degree of confidence in the prediction and/or the confidence score may be lower than if more information, or related information, is available in the merchant profile. Accordingly, the degree of confidence in the prediction and/or the confidence score may further be determined based on comparing an amount of information, or related information, in the merchant profile with one or more threshold values. The degree of confidence in the prediction and/or the confidence score may, additionally or alternatively, be based on an accuracy of previous predictions related to the user's transactions. The confidence score may be a numeric value or may be an indication such as high, medium, low, etc. or may be represented in a different way. The multi-party transaction identification module 114 may use the prediction and/or the confidence score output by the machine learning model to determine whether to consider the transaction a candidate multi-party transaction. For instance, if the machine learning model outputs a prediction that the transaction is likely a multi-party transactions and the confidence score exceeds a threshold score, the multi-party transaction identification module 114 may consider the transaction a candidate multi-party transaction.

Following through with the previous example, if user John Smith purchases dinner for $200 at The Best Restaurant in Houston, Texas on June $3^{rd}$, using a debit card associated with his banking account. When the transaction for The Best Restaurant is received at the user's bank, the user's bank account may be debited for the transaction amount and the transaction may be recorded. The system may determine that the transaction is of a type specified in the user configuration data that should be monitored and analyzed for consideration as to whether it is a possible multi-party transaction. Information about the transaction, such as the transaction amount, the merchant, the type of merchant, the class of merchant, and/or the geographical location of the merchant may be input into a machine learning model. The machine learning model may determine, using the user's spend profile, that the user normally spends in the range of $20-$50 at restaurants similar to The Best Restaurant and, using the merchant profile, may determine that customers, on average, spend between $40-$70 at The Best Restaurant. The model may determine that the user's $200 transaction represents a spike above a threshold amount, relative to the user's spend profile and/or the merchant profile, and may determine with 90% confidence that the transaction is likely a multi-party transaction. The model may output a prediction that the transaction is a multi-party transaction with a confidence score of 90. The system may determine that the confidence score satisfies a confidence score threshold and as a result may determine that the transaction is a candidate multi-party transaction.

Accordingly, at step 406, the multi-transaction identification module 114 may determine whether the transaction is a candidate multi-party transaction. If the transaction is not determined to be a candidate multi-party transaction, the multi-transaction identification module 114 may return to step 404 and continue to monitor for candidate multi-party transactions. If the transaction is determined to be a candidate multi-party transaction, the process may proceed to step 408.

At step 408, the party identification module 116 may attempt to identify other parties associated with the candidate multi-party transaction. For instance, the party identification module 116 may employ a script to scan the user's email accounts, electronic calendars, and/or social media data to determine other individuals potentially associated with the candidate multi-party transaction. For instance, the party identification module 116 may scan the user's data for information associated with the candidate multi-party transaction, such as the name of the merchant, the location of the merchant, a date associated with the transaction, or the like. In some cases, the party identification module 116 may alternatively or additionally attempt to identify parties associated with the candidate multi-party transactions, by monitoring or analyzing the transaction data or other data, such as email accounts, social media data, calendar data, location data, etc., of other users to identify transactions that may be related to the multi-party transaction. The party identification module 116 may identify contacts or friends of the user by accessing the user's social media data or contacts data. The party identification module 116 may then monitor and/or analyze the transactions of those contacts or friends also participating in the multi-party transaction decisioning system 100 and who have provided permission for such monitoring and analysis. In analyzing the transactions of the user's contacts/friends, the party identification module 116 may search for one or more transactions occurring on or about the same date and time as the multi-party transaction and/or associated with a merchant in a vicinity of the merchant associated with the multi-party transaction. Upon detecting such transactions, the party identification module 116 may determine that the contact/friend is a potential party to the multi-party transaction.

Following through with the previous example, after the user's $200 transaction at The Best Restaurant is identified as a candidate multi-party transaction, in an attempt to identify other parties to the transaction, the system may scan the user's email accounts, electronic calendars, social media data, and/or location data to identify corresponding data mentioning or providing an indication of The Best Restaurant on or about the date of the transaction—June $3^{rd}$. The scan may reveal an electronic calendar entry for June $3^{rd}$ indicating "Dinner with Kate and Ben at The Best Restaurant." In this case, the party identification module 116 may identify Kate and Ben as potential parties to the candidate multi-party transaction. The user may have more than one contact with the name Kate or Ben, and to narrow down the potential parties, the system may further access, monitor, or analyze the data (such as email accounts, electronic calendars, social media, transactions, etc.) of each of the user's friends named Kate and Ben (where such users also participate in the multi-party transaction decisioning system and have provided appropriate permissions). The system may, as a result of accessing the data of the user's friends, determine that the user's FACEBOOK friend Kate Jones has a calendar entry, for the same date as the candidate multi-party transaction—June $3^{rd}$, indicating "Dinner at The Best Restaurant on Main Street," and that the user's contact Ben Jones has location data that indicates that Ben Jones was located at the Best Restaurant on June 3$^{rd}$. As a result, Kate and Ben Jones may be identified as potential parties to the candidate multi-party transaction.

At step 410, the notification module 117 may send a notification to the user indicating that a candidate multi-party transaction has been identified. The notification may request that the user confirm that the candidate multi-party transaction is actually a multi-party transaction. In some cases, the notification may also include an indication of any individuals identified as potential parties to the candidate multi-party transaction and any contact information associated with those parties, such as an email address, a phone number, a social media handle, etc., as identified from the user's contact data, social media data, or the like. The notification module 117 may additionally indicate for each identified party an equal share or percentage of the transaction amount to be allocated to each of the parties. For instance, if three parties are identified, the transaction amount may be divided evenly between the user and the three additional parties, such that each is given a default allocation of 25% of the transaction amount. In some instances, the user interface may provide prompts for the user to change, delete, or modify the identified parties, the corresponding contact information, and/or the default allocation amounts.

For instance, following through with the above example, the user may receive a notification at the banking application 111 and via a text message at the user's smartphone, as specified in the user configuration data, indicating that a $200 transaction for The Best Restaurant was identified as a potential multi-party transaction and that Kate and Ben Jones were identified as potential parties to the transaction. The notification may provide one or more prompts asking the user to confirm whether The Best Restaurant transaction for $200 actually represents a multi-party transaction and/or whether Kate and Ben Jones were parties to the transaction. The notification may indicate that 33.33% of the total $200 transaction amount has been allocated to each Kate and Ben.

At step 412, if the user indicates that the candidate multi-party transaction is not a multi-party transaction, the process may proceed to step 414, where the transaction may be tagged as an individual transaction. Tagging the transaction as an individual transaction may involve the multi-party transaction identification module 114 storing, in the database 130 and/or in a memory of the user computing device 140a, an indication that the transaction is an individual transaction. Additionally, the machine learning training module 119 may further input the tagged transaction into the machine learning model with information associated with the transaction (such as an amount of the transaction, a date and time associated with the transaction, a merchant associated with the transaction, a type of merchant, a class of merchant, a geographical location of the merchant, a number of parties identified as being associated with the transaction) and labeled as an individual transaction, in order to update the machine learning model.

If, at step 412, the user confirms that the candidate multi-party transaction is a multi-party transaction, the process may proceed to step 416, where the transaction may be tagged as a multi-party transaction. Tagging the transaction as a multi-party transaction may involve the multi-party transaction identification module 114 storing, in the database 130 and/or in a memory of the user computing device 140a, an indication that the transaction is a multi-party transaction. The machine learning training module 119 may further input the tagged transaction into the machine learning model with information associated with the transaction (such as an amount of the transaction, a date and time associated with the transaction, a merchant associated with the transaction, a type of merchant, a class of merchant, a geographical location of the merchant, a number of parties identified as being associated with the transaction) and labeled as a multi-party transaction, in order to update the machine learning model.

At step 418, after confirmation that the candidate multi-party transaction is a multi-party transaction, the notification module 117 may further prompt the user for instructions on how to handle the multi-party transaction. For instance, the user may be prompted as to whether the multi-party transaction should be settled immediately, whether a new event should be created for the multi-party transaction, or whether action on the multi-party transaction should be skipped or postponed for the time being. Further, in some cases, the notification module 117 may additionally send a notification to the identified parties to notify the individuals that they have been identified as parties to a particular multi-party transaction.

At step 420, a determination may be made as to whether the user would like to settle the transaction now, create a new multi-party event for the multi-party transaction, or skip handling of the multi-party transaction for now.

If the user indicates that he would like to settle now, the process may proceed to step 422, where the payment delegation module 120 may output a user interface to facilitate the process of requesting payments from the identified individuals for respective portions of the amount of the multi-party transaction. This process is described in further detail in FIG. 7.

For instance, following through with the above example, if the user decides that he wants to settle up the $200 transaction with Kate and Ben Jones immediately, the user may be provided with a user interface that will facilitate the process of requesting payment from each Kate and Ben for their respective shares of the multi-party transaction.

If the user indicates that he would like to create an event for the multi-party transaction, the process may proceed to step 424, where a new multi-party event associated with the transaction may be generated by the multi-party event generation module 118. This process is described in further detail in FIG. 6.

If the user indicates that he would like to skip performing any action on the multi-party transaction for now, the process may proceed to step 426, where the notification module 117 may be configured to set up a reminder to send a subsequent notification to the user reminding the user of the unaddressed multi-party transaction. In some instances, the notification module 117 may prompt the user for information on when such reminder should be provided.

Figure 5:
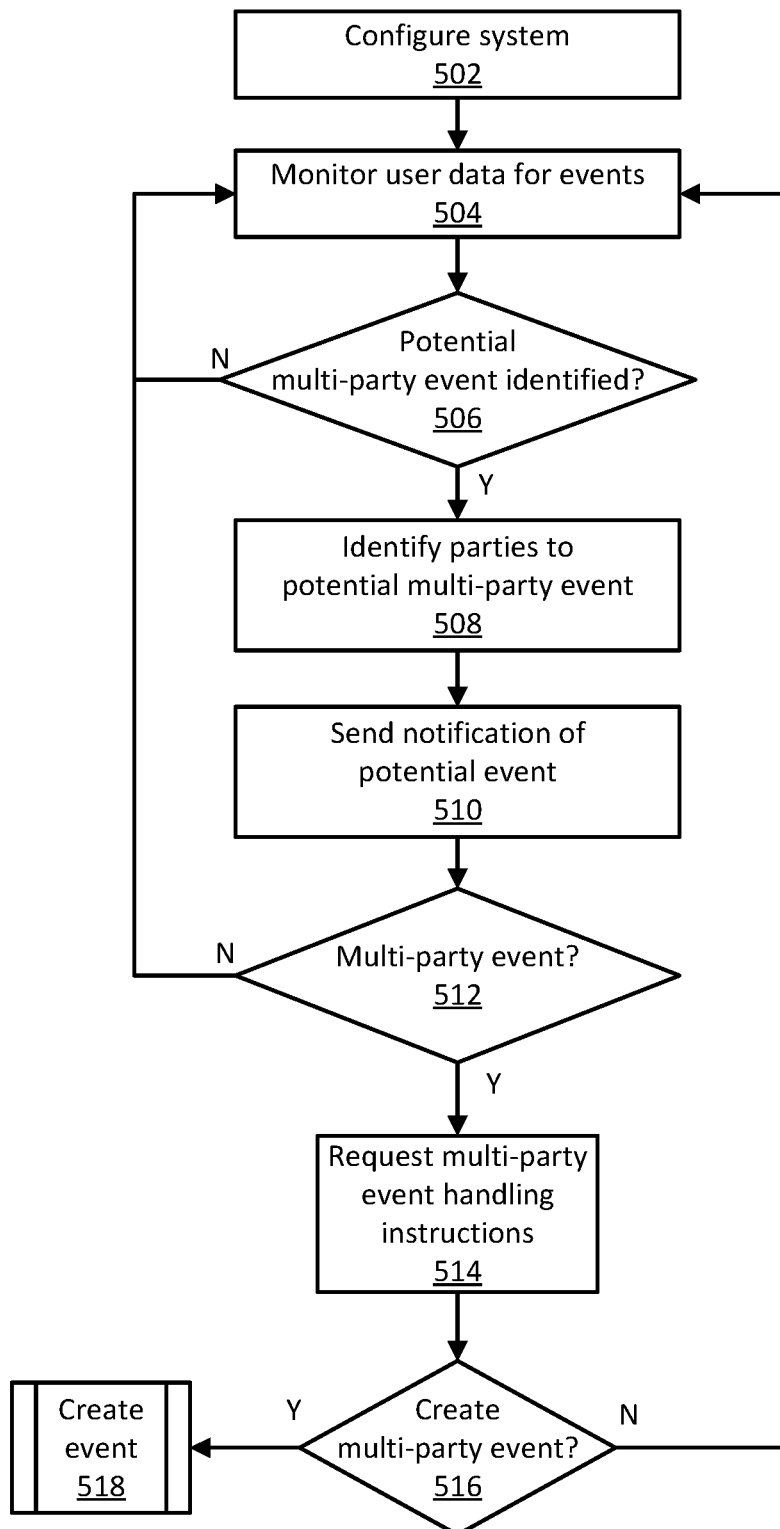

Referring to FIG. 5, an example method for automatically detecting a multi-party event is provided.

At step 502, the user computing device 140a, operating as the multi-party transaction decisioning device 110, may receive a request to configure the user computing device 140a with the multi-party transaction decisioning system 100. In response to the request, the system configuration module 112 may control configuration of the multi-party transaction decisioning system 100 on the user computing device 140a in the manner described with respect to step 402 of FIG. 4.

At step 504, after the user computing device 140 has been configured with the multi-party transaction decisioning system 100, the event detection module 115 may begin to monitor the user's data for potential events. For instance, the event detection module 115 may monitor and/or analyze one or more of the user's banking or credit card transactions, email accounts, electronic calendars, and/or social media data and may determine that the user made a purchase associated with a potential event, such as the purchase of an airline ticket, hotel accommodations, tickets to a sporting event, or the like. A list of the types of purchases and/or types/categories of merchants associated therewith that may be indicative of events may be maintained in the database 130 and/or in a memory associated with the user computing device 140a. In some cases the event detection module 115 may use just a single data point, such as an email including an airline ticket receipt, to determine whether a user may participate in a potential event. In other cases, the event detection module 115 may use multiple data points to determine whether the user may participate in a potential event, such as an email including an airline ticket receipt along with location data from the user's device, such as the user computing device 140a. The location data may be used to confirm that the user is at or is in a vicinity of a location associated with a determined potential event on the corresponding date. The location data may additionally be used alone to determine when the user may be located more than a threshold distance from the user's home geographical location. In this case, the location data in and of itself may be an indication of a potential event. The event detection module 115 may predict that the user is travelling and may identify such travel as the potential event.

Following through with the example from FIG. 4, the system may monitor and analyze user John Smith's data, such as his banking or credit card transactions, email accounts, electronic calendars, social media data, and/or location data, and may identify a transaction associated with a rental car merchant. Rental car merchants may be included in the list of types/categories of merchants that qualify as indicators of potential events. The system may further identify an email of a receipt for the rental car transaction. The system may scan the receipt to identify a date and/or a location associated with the rental car transaction. The system may determine from scanning the receipt that the user has rented a car for the period of June $1^{st}$-$7^{th}$ in Houston, Texas. The system may further determine that Houston, Texas is greater than a threshold distance from the user's home location. Using the multiple data points acquired, the system may identify a potential event for the period of June $1^{st}$-$7^{th}$ in Houston, Texas.

At step 506, the event detection module 115 may determine whether the monitored data provides any indication of a potential event. If a potential event is not detected, the event detection module 115 may return to step 504 and continue to monitor the data for any potential events. If a potential event is detected, the process may proceed to step 508.

At step 508, the party identification module 116 may attempt to identify parties associated with the potential event. For instance, the party identification module 116 may scan and analyze data from the user's email accounts, electronic calendars, location data, and/or social media data to determine other individuals possibly associated with potential event. For instance, the party identification module 116 may scan the user's data for additional information associated with the event, such as the name or location of a merchant associated with the transaction that triggered the identification of the potential event, a date associated with the transaction, or the like.

Following through with the above example, the system may further scan John's email containing the receipt for the rental car transaction and may identify other drivers identified as being associated with the rental car purchase. The system may determine that Ellen Smith and Bobby Smith are named in the receipt as additional drivers. The system may identify Bobby Smith as a potential party to the event and may exclude Ellen Smith as a potential party in view of the user's preference during system configuration to exclude his wife Ellen as a party to a multi-party event or multi-party transaction.

In addition to monitoring and analyzing the user's data, the party identification module 116 may alternatively or additionally monitor and analyze data associated with other users participating in the multi-party transaction decisioning system 100. The party identification module 116 may monitor the transaction data, email data, social media data, calendar data, location data, etc., of the other users to identify transactions that may be related to the potential event. The other user's may be friends, contacts, or associates of the user as identified in the user's data—such as the user's social media friends, telephone contacts, email contacts, or the like. The party identification module 116 may search the other users' data for one or more transactions, or other indications of similar events, occurring on or about the same date/time as the identified potential event and/or in a vicinity of the potential event. Upon detecting such transactions or other data, the party identification module 116 may determine that the contact/friend is a potential party to the multi-party transaction.

Following through with the above example, the system may further monitor and analyze the data of the John's friends. In doing so, the system may detect that the John's LINKEDIN friend David Rogers has a transaction for a purchase with an airline merchant. Further analysis of David's data may reveal an email with an airline ticket receipt corresponding to the detected airline transaction and indicating travel to Houston, Texas on May $31^{st}$ with a return date of June $4^{th}$. Because David's data indicates that he will be in Houston around the same time period of the potential event identified for John, David may also be identified as a potential party to the event.

At step 510, the notification module 117 may send a notification to the user indicating that a potential event has been identified. The notification may request that the user confirm that the potential event is actually a multi-party event. In some cases, the notification may also include an indication of any individuals identified as potential parties to the potential event.

For instance, following through with the above example, the user John may receive a notification at the banking application 111 and via a text message at the user's smartphone, as specified in the user configuration data, indicating that a potential event for June $1^{st}$-$7^{th}$ in Houston, Texas has been identified and that Bobby Smith and David Rogers have been identified as possible parties to the potential event. The notification may provide one or more prompts asking the user to confirm whether the identified potential event represents an actual multi-party event and whether Bobby Smith and/or David Rogers are parties to the event. In some instances, where the potential event is identified as a multi-party event, the notification may provide prompts for the user to manually input different or additional parties to the event.

At step 512, if the user indicates that the potential event is not a multi-party event, the process may return to step 504 for continued monitoring of the user's data. If the user confirms that the potential event is a multi-party event, the process may proceed to step 514, where the notification module 117 may prompt the user for instructions on how to handle the multi-party event. For instance, the user may be prompted as to whether a new multi-party event should be created for the identified event.

At step 516, a determination may be made as to whether a new multi-party event should be created. If the user indicates that a new multi-party event should be created, the process may proceed to step 518, where a new multi-party may be generated by the multi-party event generation module 118. This process is described in further detail in FIG. 6. If the user indicates that a new multi-party event should not be created, the process may return to step 504 for continued data monitoring.

Figure 6:
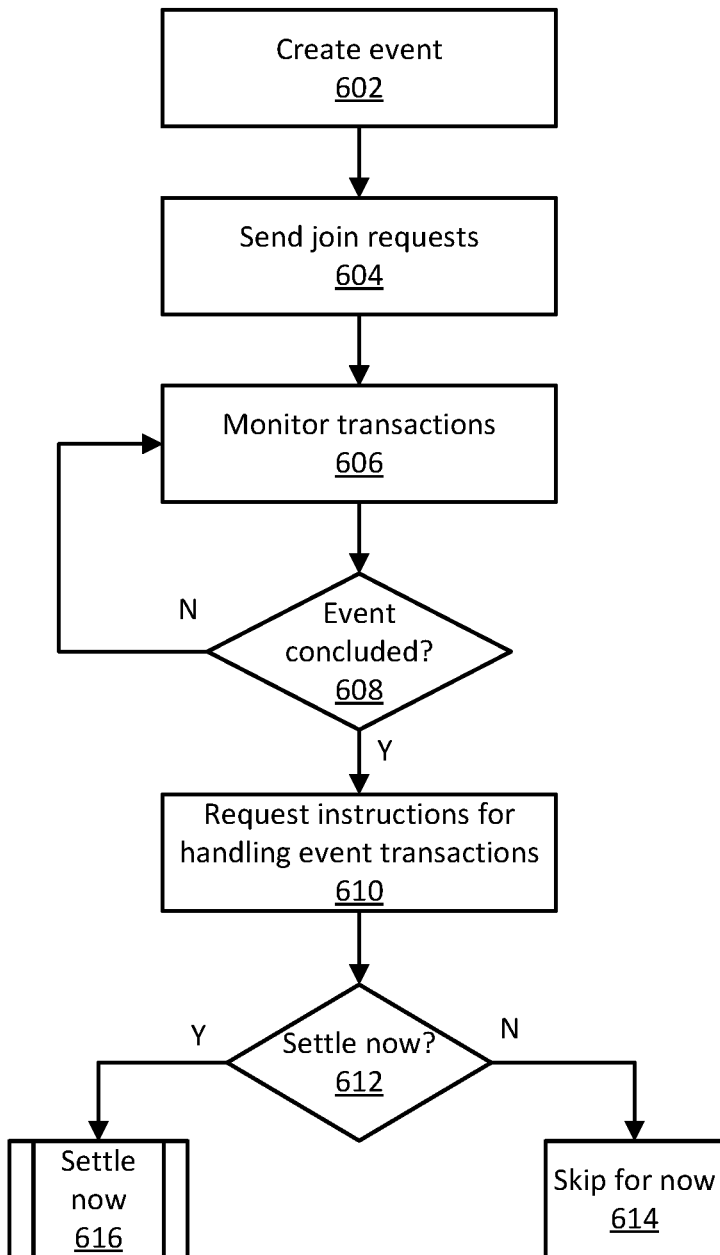

Referring to FIG. 6, an example method for creating a multi-party event is provided.

At step 602, the multi-party event generation module 118 may create a new event after automatically identifying a multi-party transaction (see FIG. 4, step 424), after automatically detecting a potential event (see FIG. 5, step 518), or after a user requests the manual creation of a new event. The multi-party event generation module 118 may output a user interface to the banking application 111, which provides prompts for entering information related to the multi-party event, such as a name, a description, a start and end date, types of merchants/transactions to be associated with the event, a location associated with the event, parties associated with the event, and/or a share or percentage of transaction amounts that should be allocated to each of the parties. The multi-party event generation module 118 may prepopulate the user interface with some or all of the event-related information based on data identified when automatically identifying the multi-party transaction or detecting the potential event. The multi-party event generation module 118 may provide prompts for the user to enter additional data, such as additional parties to the event, or to modify or delete any prepopulated data. The multi-party event generation module 118 may additionally automatically identify and prepopulate the user interface with contact information, such as an email address, a phone number, a social media handle, etc., associated with the identified parties using the user's contact data, social media data, or the like. Alternatively or additionally, the multi-party event generation module 118 may provide the user with prompts to manually enter or import contact information for the identified parties or to manually link the identified parties with corresponding contact information stored at the user's device, such as the user computing device 140a.

For instance, following through with the above example of FIG. 5, if the user indicated that a new event should be created for the June $1^{st}$-$7^{th}$, Houston, Texas event detected from the user's rental car transaction data, the system may output, to the banking application 111, a user interface for generating a new multi-party event and may prepopulate the user interface with the name "Trip to Houston, Texas," start date of "June $1^{st}$," end date of "June $7^{th}$," and location of "Houston, Texas." The user may indicate, via the user interface, that only restaurant, hotel, and sporting event related transactions/merchants should be monitored for multi-party transactions for the event. The user interface may further be prepopulated with the user's name "John Smith" and the names of the identified parties "Bobby Smith" and "David Rogers" as parties to the event. The system may prepopulate David's contact information with the email address associated with his LINKEDIN account. The system may prompt the user to enter contact information for Bobby Smith, and the user may in turn enter a phone number for Bobby. Additionally, the user may indicate that his own share of the transaction amounts associated with the event is 50%, and that Bobby's share and David's share are each 25%. After all of the event related information is entered, a new multi-party event may be generated by the system.

At step 604, the notification module 117 may send the parties associated with the multi-party event a request to join the multi-party event and to share/associate their own transactions occurring during multi-party event with the generated multi-party event and/or to allow their own data to be monitored and analyzed. The request may be sent to the parties using the contact information indicated in the generated multi-party event.

For instance, following through with the above example, the system may send a notification to David Roger by email and to Bobby Smith by text, notifying that they have been identified as parties to John Smith's "Trip to Houston, Texas" event for "June $1^{st}$-June $7^{th}$." The notification may prompt for whether the individual would like to share his own transactions occurring during June $1^{st}$-June $7^{th}$ and/or his own data with the "Trip to Houston, Texas" event.

At step 606, upon generation of the new multi-party event, the multi-party transaction identification module 114 may monitor transactions of the user and/or the other parties to the event, that occur during the date range and/or at a location specified by the multi-party event and of the type specified by the multi-party event, for any candidate multi-party transactions. Candidate multi-party transactions identified during the monitoring may be associated with the multi-party event. For instance, when the multi-party transaction identification module 114 identifies a candidate multi-party transaction (such as in the manner described with respect to FIG. 4) that occurs during the start and end dates identified for the multi-party event and/or at a location identified for the multi-party event, the multi-party event generation module 118 may cause such transaction to be linked with or otherwise indicated as being associated with the multi-party event. In some instances, the multi-party event generation module 118 may further cause any additional parties identified as being associated with the identified transactions to be added as potential parties to the multi-party event.

Following through with the above example, the system may monitor the transactions and other data of the user John Smith and of David Roger and Bobby Smith. The system may identify as candidate multi-party transactions that should be associated with the "Trip to Houston, Texas" event, those that occur during June $1^{st}$-$7^{th}$ in or around the vicinity of Houston, Texas, and that are restaurant, hotel, or sporting event related purchases. The system may identify the user's June $3^{rd}$, $200 transaction for The Best Restaurant and may associate the transaction with the "Trip to Houston, Texas" event and may also associate Kate and Ben Jones, identified as parties to that transaction, as additional potential parties to the "Trip to Houston, Texas" event. The system may further identify a transaction from Bobby Smith dated June $7^{th}$ for $1000 for The Best Hotel, and a transaction from David Rogers dated June $1^{st}$ for $400 for the Houston Astros, and may associate both transactions with the user's "Trip to Houston, Texas" event.

At step 608, the multi-party transaction identification module 114 may determine whether the multi-party event for which transactions and other data is being monitored has concluded based on the end date associated with the multi-party event. If the multi-party event has not concluded, the process may return to step 606 for continued monitoring of transactions. If the multi-party event has concluded, the process may proceed to step 610, where the notification module 117 may send a notification to the user indicating that the multi-party event has concluded and prompting the user for instructions on how to handle the transactions associated with the multi-party event. For instance, the user may be prompted as to whether the transactions should be settled between the parties immediately. In some cases, the notification may include a listing of the transactions identified as being associated with the multi-party event. The user may be provided with options to manage the transactions associated with the multi-party event—such as to manually add or associate additional transactions with the event, to remove transactions that should not be associated with the event, to adjust a share or percentage of the transaction amounts to be allocated to each party, to change a date range, or location, or the like.

For instance, following through with the above example, after June $7^{th}$, the system may send a notification to the user, via the banking application 111 and via text message, indicating that the "Trip to Houston, Texas" event has concluded. The notification may include a listing of all of the restaurant, hotel, and sporting event related transactions associated with the parties to the event (e.g., the user, Bobby Smith, Kate Jones, Ben Jones, and David Rogers), which occurred in Houston, Texas during June $1^{st}$-$7^{th}$. For instance, the notification may include: the June $3^{rd}$ transaction for $200 for The Best Restaurant paid for by John Smith; the June $7^{th}$ transaction for $1000 for The Best Hotel paid for by Bobby Smith; and the June $1^{st}$ transaction for $400 for the Houston Astros paid for by David Rogers. The notification may indicate that a default share or percentage of the transaction amounts allocated to each party is 20%. For instance, the default share may be based on an even allocation of the transaction amounts to each party. The notification may further prompt the user as to whether the process to settle the transactions with the parties should be initiated.

At step 612, the multi-party transaction identification module 114 may determine whether the process to settle the transactions associated with the multi-party event should be initiated. If the user indicates that the transactions should not be settled now, the process may proceed to step 614, where the notification module 117 may be configured to set up a reminder to send a subsequent notification to the user reminding the user of the unaddressed transactions associated with the multi-party event. In some instances, the notification module 117 may prompt the user for information on when such reminder should be provided. If the user indicates that the transactions should be settled now, the process may proceed to step 616, where the payment delegation module 120 may output a user interface to the banking application 111 to facilitate the process of delegating portions of the transaction amounts to and requesting payments from the identified parties to the multi-party event. This process is described in further detail in FIG. 7.

Figure 7:
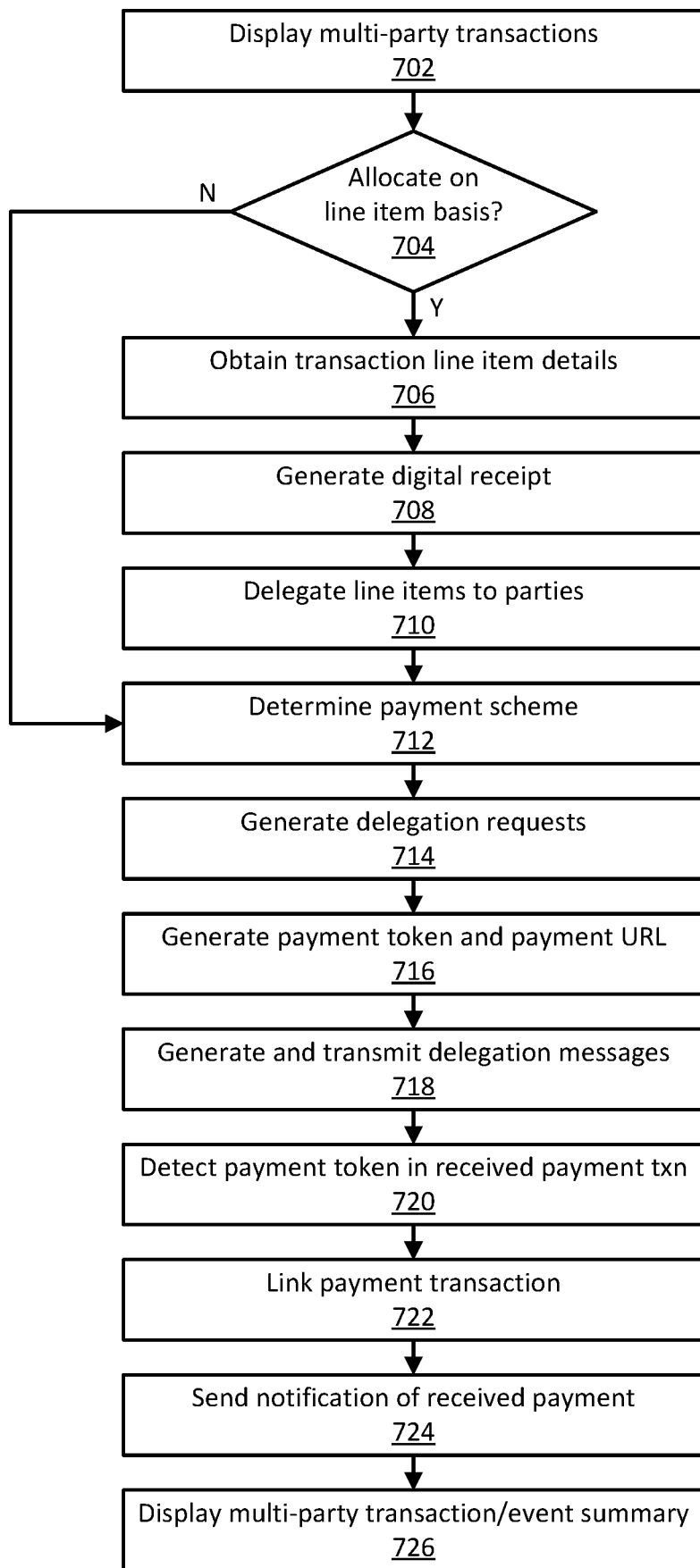

Referring to FIG. 7, an example method for multi-party transaction settlement is provided. Settlement may occur after an individual multi-party transaction is automatically detected, such as described with respect to FIG. 4 (e.g., at step 422), after an individual multi-party transaction is manually identified by the user, or after the conclusion of a multi-party event, such as described with respect to FIG. 6 (e.g., at step 616).

At step 702, the payment delegation module 120 may cause a user interface to be output to display a list of multi-party transactions for settlement. The user interface may be output via the banking application 111 at the user computing device 140a operating as the multi-party transaction decisioning device 110. The list of multi-party transactions may include those transactions automatically detected by the multi-party transaction identification module 114. For instance, as described with respect to FIG. 4, after the user confirms that an identified candidate multi-party transaction is a multi-party transaction, the user may request (such as at step 422) that the multi-party transaction be settled between the parties to the transaction. Additionally, as described with respect to FIG. 6, after an automatically detected event or a manually created event concludes, the user may request (such as at step 616) that the multi-party transactions associated with the event be settled between the identified parties. The list of multi-party transactions may alternatively or additionally include multi-party transactions manually selected by the user for settlement. For instance, the user may select, via the banking application 111, one or more transactions associated with, for example, the user's banking or credit card account for settlement between one or more parties.

The list of multi-party transactions may include information associated with each transaction, such as a transaction date, a transaction description; a total transaction amount; parties identified as being associated with the transaction (such as by the party identification module 116 at steps 408 and 508 of FIGS. 4 and 5, respectively); corresponding contact information associated with each party (such as identified at steps 410 and 602 of FIGS. 4 and 6), such as an email address, a phone number, a social media handle, or the like; and/or a share or percentage of the transaction amount to be allocated to each party (such as at steps 410 and 602 of FIGS. 4 and 6, respectively). Where the user has not already specified a share/percentage, the share/percentage may be a default amount based on the number of parties to the transaction. The user interface may provide options for the user to adjust, change, add, or delete the parties associated with the transaction, the corresponding contact information for the parties, and/or the share or percentage of the transaction amount to be allocated to each. For instance, the share for one or more of the transactions may be changed to a different percentage or to a specific dollar amount.

For instance, following through with the above example of FIG. 6, the user interface may list the various transactions associated with the "Trip to Houston, Texas" event, such as the June $3^{rd}$ transaction for $200 for The Best Restaurant paid for by John Smith; the June $7^{th}$ transaction for $1000 for The Best Hotel paid for by Bobby Smith; and the June $1^{st}$ transaction for $400 for the Houston Astros paid for by David Rogers. The list may indicate that each party has been allocated a default 20% of each transaction amount since there are five parties associated with the event (e.g., the user, Bobby Smith, Kate Jones, Ben Jones, and David Rogers). The user may adjust the shares allocated to Bobby and David for dinner at The Best Restaurant to 0% since only the user, his wife Ellen (though excluded as a party per the user preferences), and Kate and Ben Jones attended dinner.

At step 704, in some instances, the payment delegation module 120 may receive a request from the user to adjust the allocation of portions of the transaction amount of one or more transactions by allocating individual line items associated with the transaction to individual parties. For instance, the user interface may provide an option for the user to select a transaction and to allocate a portion of an amount of the transaction to the parties based on the individual line items associated with the transaction.

For instance, following through with the above example, for the $200 transaction for The Best Restaurant, the user may request to allocate to each party to the transaction only those items from the transaction actually associated with that particular party. For instance, the $200 dinner transaction may include amounts, or line items, for four entrees, three drinks, two appetizers, tax, and tip. John may have had lasagna for $20 and a beer for $9; Ellen may have had lobster for $30; Kate may have had ribeye steak for $25 and a glass of wine for $12; and Ben may have had a salad for $15 and a glass of wine for $12. The group may have shared appetizers for a total of $23.50. The tax may have totaled $13.50 and the tip $40. Accordingly, the user may wish to adjust the allocations so that each party is only allocated the items that they consumed and a portion of the amount of the items shared between the group, such as for the appetizers, the tax, and the tip.

At step 706, in response to the request to perform a line item allocation of one or more of the transaction, the payment delegation module 120 may obtain the line item details for the transactions. For instance, where the transactions is an enhanced transaction, the payment delegation module 120 may obtain the line item details from the database 130, and where the transaction is not an enhanced transaction, the payment delegation module 120 may provide a user interface, via the banking application 111, for the user to manually enter the line item details or for the user to upload an image of the receipt for retrieving the line item details from the receipt image.

That is, in some instances, when the transaction is initially received from the payment processing system 160 and processed by the transaction processing module 113, detailed information about the transaction may additionally be received from a merchant device of the merchant associated with the transaction. The merchant device may transmit to the multi-party transaction decisioning device 110 the line item information associated with the transaction. The line item information may include a name or description of each item purchased as part of the transaction, a price of each item, and/or a quantity of each item. The line item information may be stored together with the associated transaction in the database 130 to enhance the commonly provided transaction information, which may include only a merchant name, a merchant location, a total amount, and payment information.

In some instances, the user may upload the line item information associated with a transaction, by manually entering such information in a user interface provided by the banking application 111 or by using the banking application 111 to capture an image of a receipt associated with the transaction. For instance, the user may be provided with a user interface to manually enter a description, an amount, and a quantity for each line item of the transaction, a tax amount associated with the transaction, a tip amount associated with the transaction, and/or the like. Additionally or alternatively, the user may be provided with a user interface for capturing an image of a transaction receipt may be provided. The user computing device 140a may receive the receipt image and may process the receipt using one or more image analysis and/or computer vision techniques, such as optical character recognition (OCR), object recognition, or the like, to convert one or more portions of the image of the receipt into text. After converting one or more portions of the image of the receipt to text, the user computing device 140a may analyze the converted text to extract the line item information from the text. In some instances, the receipt may have printed thereon a bar code or a quick response (QR) code, which may be embedded with information identifying the receipt transaction, with the line item information, and/or with a link to a script that may cause the transaction identifying information (such as a unique transaction identifier, the merchant name, the merchant location, a date/time of the transaction, the transaction amount, a payment method, etc. or a combination thereof) and/or the line item information (such as a description, an amount, a quantity, a pro rata tip amount, pro rata tax amount, or the like) to be requested and retrieved from a merchant device of a merchant associated with the transaction receipt. In such cases, upon capturing the image of the receipt, the user computing device 140a may detect the bar code or QR code and may receive or retrieve the transaction identifying information and/or the line item information using the bar code or the QR code. The line item information provided by the user, manually or via the receipt upload, may be stored together with the associated transaction in the database 130 to enhance the transaction. The transaction may additionally be flagged as an enhanced transaction to indicate the presence of the line item information.

At step 708, the payment delegation module 120 may generate a digital receipt associated with the selected transaction for display in user interface output via the banking application 111. For instance, the payment delegation module 120 may cause a user interface to display a digital receipt for the selected transaction including the obtained line item information associated with the transaction.

At step 710, the payment delegation module 120 may receive user input indicating particular line items from the digital receipt that should be delegated to particular ones of the one or more of the parties to the transaction. In some cases, the payment delegation module 120 may output a user interface displaying a list of the parties already identified as being associated with the multi-party transaction or the multi-party event and their contact information. Additionally or alternatively, the payment delegation module 120 may output user interface display a general list of the user's contacts from the user's contact data, email data, phone data, social media data, etc. and corresponding contact information. The user may be prompted to select individuals to whom one or more of the various line items of the selected transaction should be delegated. In some cases, the user may allocate to the selected individual a full payment amount for a particular line item or may allocate a partial payment amount for the particular line item.

For instance, following through with the above example, for the $200 transaction for The Best Restaurant, the user may allocate to Kate: the $25 ribeye, the $12 glass of wine, 25% of the $23.50 appetizer, 25% of the $13.50 tax, and 25% of the $40 tip; and may allocate to Ben: the $15 salad, the second $12 glass of wine, 25% of the $23.50 appetizer, 25% of the $13.50 tax, and 25% of the $40 tip.

After the user has indicated the manner in which each of the multi-party transactions should be split or delegated (such as described at steps 702 and 710), at step 712, the payment delegation module 120 may determine a payment scheme for settling the transactions. Where only a single multi-party transaction is being settled or where multiple multi-party transactions associated with a single payee are being settled, the settlement scheme may be straight-forward, where it is determined that each party to whom some portion of the transaction amount(s) is delegated is to pay their delegated portion(s) to the single user/payee associated with the multi-party transaction(s). One the other hand, where multiple multi-party transactions associated with more than one payee is being settled, such as from a multi-party-event where transactions from more than one party to the event are being settled, the payment delegation module 120 may determine a payment scheme that is more efficient than a straight-forward one in which each party is delegated to pay their respective delegated portions to each corresponding each payee. Instead, where multiple payees are involved, the payment delegation module 120 may aggregate all of the multi-party transactions and calculate what each party owes in total, e.g., from amongst all of the multi-party transactions associated with the multi-party event, and to whom the various amounts are owed. For instance, the payment delegation module 120 may employ an algorithm to determine a payment scheme that optimizes or minimizes the payment transactions needed to settle the amounts owed for the multi-party transactions associated with the multi-party event.

For instance, following through with the previous example, as discussed, three transactions may be associated with the multi-party event "Trip to Houston, Texas"—Transaction #1—$200 for The Best Restaurant paid for by John Smith; Transaction #2—$1000 for The Best Hotel paid for by Bobby Smith; and Transaction #3—$400 for the Houston Astros paid for by David Rogers. Additionally, five parties may be associated with the event—the user (John Smith), Bobby Smith, Kate Jones, Ben Jones, and David Rogers. Further, as discussed, Transaction #1 may be allocated to various parties on a line item basis, such that Kate owes $56.25 to John for dinner; Ben owes $46.25 to John for dinner; and Bobby and David each owe $0 to John for dinner (since none of the line items from the dinner transaction were allocated to either), as shown below in Table 1. Transactions #2 and #3 may be allocated to the various parties on a default allocation basis, such that each party is allocated an equal 20% share of the total transaction amount. Accordingly, for Transaction #2, John, Kate, Ben, and David may each owe $200 to Bobby for the hotel accommodations; and for Transaction #3, John, Kate, Ben, and Bobby may each owe $80 to David for the baseball tickets, as shown in Table 1.

TABLE 1

|  | Owed to John for Txn #1 | Owed to Bobby for Txn #2 | Owed to David for Txn #3 | Owed to Kate | Owed to Ben | Total Owed by Party |
|---|---|---|---|---|---|---|
| John | X | $200 | $80 | X | X | $ 280 |
| Bobby | X | X | $80 | X | X | $ 80 |
| David | X | $200 | X | X | X | $ 200 |
| Kate | $ 56.25 | $200 | $80 | X | X | $ 336.25 |
| Ben | $ 46.25 | $200 | $80 | X | X | $ 326.25 |
| Total Owed to Party | $102.50 | $800 | $320 | $0 | $0 | $1222.50 |

As shown from Table 1, John is owed a total of $102.50 for paying for dinner, but he also owes a total of $280 for the hotel and baseball tickets paid for by other parties of the group. Accordingly, the net owed to John is −$177.50. That is, John needs to pay out to $177.50 more than he will receive. Bobby is owed a total of $800 for paying for the hotel, but he also owes a total of $80 for the baseball tickets. Accordingly, the net owed to Bobby is $720. David is owed a total of $320 for paying for the baseball tickets, but he also owes $200 for the hotel. The net owed to David is $120. No one owes any money to Kate or Ben, but Kate and Ben owe $336.25 and $326.25, respectively, for the dinner, hotel, and baseball tickets paid for by the others. To avoid the need for 10 separate transactions (e.g., John to Bobby, John to David, Bobby to David, David to Bobby, Kate to John, Kate to Bobby, Kate to David, Ben to John, Ben to Bobby, and Ben to David), the system may determine a more efficient and optimized payment scheme based on the net amounts owed to the various parties.

As shown below in Table 2, only John, Kate, and Ben actually owe more to the group than is owed to them. That is, Bobby and David should receive more than they need to pay to out.

TABLE 2

|  | Owed | Owes | Net |
|---|---|---|---|
| John | $102.50 | −$280 | −$177.50 |
| Bobby | $800 | −$ 80 | $720 |
| David | $320 | −$200 | $120 |
| Kate | $ 0 | −$336.25 | −$336.25 |
| Ben | $ 0 | −$326.25 | −$326.25 |

Accordingly, the system may determine that a more optimized payment scheme is for Kate and Ben to pay the share they each owe to Bobby, and for John to split what he owes between Bobby and David. For instance, as shown in Table 3 below, Kate and Ben may pay the full amount they each owe directly to Bobby, and John may pay $57.50 of what he owes to Bobby. In this way, what is owed to Bobby and what is owed by Kate and Ben may be resolved. John may additionally pay the remainder of what he owes—$120—directly to David. In this way, what is owed to David and what is owed by John is resolved. Accordingly, optimizing settlement of the transactions associated with the multi-party event in this way, allows for a more efficient payment scheme between parties to the multi-party event—such as, in this example, settlement with four payments versus the ten payments, shown above, that would otherwise be required with a straight-forward payment scheme.

TABLE 3

|  | Net | John owes −$177.50 | Kate owes −$336.25 | Ben owes −$326.25 |
|---|---|---|---|---|
| Bobby | $720 | −$ 57.50 | −$336.25 | $326.25 |
| David | $120 | −$120 | — | — |
| Total | $840 | −$177.5 | −$336.25 | −$326.25 |

Accordingly, the payment delegation module 120 may output a user interface, via the banking application 111, displaying a listing of the net amounts owed to each party and the corresponding amounts delegated to the various parties based on the determined optimized payment scheme.

At step 714, the payment delegation module 120 may generate a delegation request for each party to whom portions of the transaction amounts have been delegated in accordance with the payment scheme. The delegation request may include information identifying the individual multi-party transaction being delegated where a single transaction is being delegated, or the multi-party event, where multiple multi-party transactions associated with a multi-party event are being delegated. For instance, the delegation request may include a delegation request identifier which uniquely identifies the delegation request, a transaction identifier which uniquely identifies the multi-party transaction being delegated or an event identifier which uniquely identifies the multi-party event, a transaction or event description, a value or amount being delegated to the party, a transaction or event date(s), or the like. The information may additionally include the name and contact information for the party to whom the amount is being deleted, e.g., email address, phone number, social media handle, etc. The delegation request may be stored in the database 130 and/or in a memory associated with the user computing device 140*a*.

For instance, following through with the above example, delegation requests may be generated for each John, Kate, and Ben, for the amounts delegated to each.

At step 716, the payment delegation module 120 may generate a unique payment token for the multi-party transaction being delegated (where a single transaction is being delegated) or for the multi-party event (where multiple transactions associated with an event are being deleted) and a unique payment URL for each of the generated delegation requests. For instance, the payment delegation module 120 may identify the multi-party transaction or the multi-party event in the database 130 and/or in a memory associated with the user computing device 140*a* by the transaction identifier or event identifier indicated in the delegation request and may update the multi-party transaction or the multi-party event, in the database 130 or in a memory associated with the user computing device 140*a*, to indicate, or to be otherwise associated with, the generated payment token. In some cases, the payment delegation module 120 may update a memo, discretionary, miscellaneous, or other unused field associated with the transaction record with the payment token. The payment token may be used to associate the multi-party transaction or the multi-party event with subsequent payments received from the parties. In some cases, the payment token may comprise a URL link to a script configured to access information associated with delegation requests associated with the multi-party transaction or the multi-party event. The payment token link may be compressed using, for example, a URL shortener to reduce the length of the link for convenience in transmission.

Additionally, the payment delegation module 120 may generate a payment URL for each of the generated delegation requests. The payment URL may include one or more parameters containing information associated with the delegation request. For instance, the URL parameters may include information identifying the individual (e.g., the payee) requesting the payment or to whom the payment should be sent; the payment amount delegated to the delegate; and/or information identifying where payment should be sent—such as a bank routing number, a bank account number, a credit card number, or the like. In some instances, the information identifying where payment should be sent may simply be an email address or phone number of payee, which may later be used when payment from the delegate is received at the payee's bank to access the payee's bank account number or credit card number from a secure source, such as the multi-party transaction decisioning device 110. The URL parameters may additionally include the payment token generated for the delegated multi-party transaction or multi-party event. One or more of the URL parameters may be encrypted to ensure security of sensitive information during transmission. In some instances, rather than include all of the aforementioned information in various URL parameters, the payment token itself, included in a parameter of the payment URL, may comprise a URL link to a script configured to request or retrieve the aforementioned information. For instance the payment token link may execute a script configured to request or retrieve, from the multi-party transaction decisioning device 110 or the database 130, some or all of the aforementioned information, such as from the stored delegation request. The payment URL may additionally be configured to execute a script configured to initiate a payment process from the delegate to the payee when accessed.

At step 718, the payment delegation module 120 may generate and transmit a delegation message to each of the delegates using the contact information provided in the delegation request for that delegate and including the corresponding payment URL generated by the payment delegation module 120. The delegation message may additionally or alternatively be output via the banking application 111 where the delegate also has access to the baking application 111. The delegation message may request payment for the delegated portions of the transaction indicated in the delegation request. The message may, in some instances, itemize the individual items delegated to the delegate and the associated amounts. The message may additionally, in some instances, include the total amount delegated to the delegate. As described in detail with respect to FIG. 8, the delegation message may be received at a user device associated with the delegate, such as the one or more delegate computing devices 150 and a payment process may be initiated at the one or more delegate computing devices 150 when the delegate accesses the payment URL included therein. When the delegate submits payment, the transaction record associated with the payment may be embedded with the payment token, the transaction record may be received and processed by the payment processing system 160, and eventually transmitted to the payee's bank with the payment token stored therein.

Following through with the above example, delegation messages may be generated and transmitted to John, Kate, and Ben, for the amounts delegated to each. For example, a first delegation message may be transmitted to John indicating that $57.50 has been delegated to him for payment to Bobby. A second delegation message may be transmitted to John indicating that $120 has been delegated to him for payment to David. A third delegation message may be transmitted to Kate indicating that $336.25 has been delegated to her for payment to Bobby. And a fourth delegation message may be transmitted to Ben indicating that $326.25 has been delegated to him for payment to Bobby. In some instances, instead of sending multiple delegation messages to a single party for multiple delegation requests, a single delegation message may be sent to the party and may include the multiple delegation requests therein. John, Kate, and Bobby may each initiate payment of their delegated amounts to their respective payees.

At step 720, when payment from one or more of the delegates is received at the payee's bank and processed to credit the payee's account, such as by the transaction processing module 113, the transaction processing module 113 may detect the payment token in the received payment transaction record. Detection of the payment token in the payment transaction record may serve as an indication that the payment transaction is a payment associated with a delegation request previously made by the user. The payment token may be embedded in an unused or memo field of the payment transaction record, and the transaction processing module 113 may distinguish the payment token from other miscellaneous text that might otherwise be included in the payment transaction record (such as when the payment token is embedded in a memo field) based on an expected format of the payment token or based on successfully decoding the suspected payment token.

At step 722, upon detection of the payment token in he received payment transaction, the payment delegation module 120 may use the payment token to link the payment transaction with the original delegated multi-party transaction or multi-party event. For instance, the payment delegation module 120 may query the database 130, using the payment token, to identify the delegated multi-party transaction or the multi-party event having the same payment token stored therewith. The payment delegation module 120 may store, in association with the multi-party transaction or the multi-party event, the transaction identifier identifying the received payment transaction so that the payment transaction received from the delegate may be linked with the multi-party transaction or the multi-party event. The payment delegation module 120 may additionally update the corresponding stored delegation request to indicate that payment has been received from the delegate.

At step 724, after identifying the multi-party transaction or the multi-party event and linking the received payment transaction from the delegate thereto, the notification module 117 may cause a notification to be sent to the user notifying that a payment associated with a delegation request has been received. For instance, the notification module 117 may send an email or a text message to the user, or may output a notification via the banking application 111, notifying of receipt of a payment from the delegate. The notification may include a link to a user interface of the banking application 111 for displaying the multi-party transaction or the multi-party event and information associated with the received payment.

At step 726, the payment delegation module 120 may cause the banking application 111 to output a user interface displaying a transaction summary comprising the multi-party transaction with any received payment transactions attached thereto or an event summary comprising information associated with the multi-party event along with any received payment transactions attached thereto. For instance, the payment delegation module 140 may cause the banking application 111 to output a user interface that displays the received payment transactions underneath the original multi-party transaction, for example, to indicate that the received payment transactions are associated with the original multi-party transaction. In some instances, the user may be able to select a multi-party transaction and an option to view associated received payments, and a list of received payments may be displayed. Additionally, received payments may be output in a similar manner when associated with a multi-party event. In some instances, the user may be able to select the multi-party transaction or the multi-party event and also view pending delegate requests, e.g., those for which parties have not yet sent payment. The user may be able to modify pending delegate requests to remove requests, adjust amounts, add additional parties, or the like.

Figure 8:
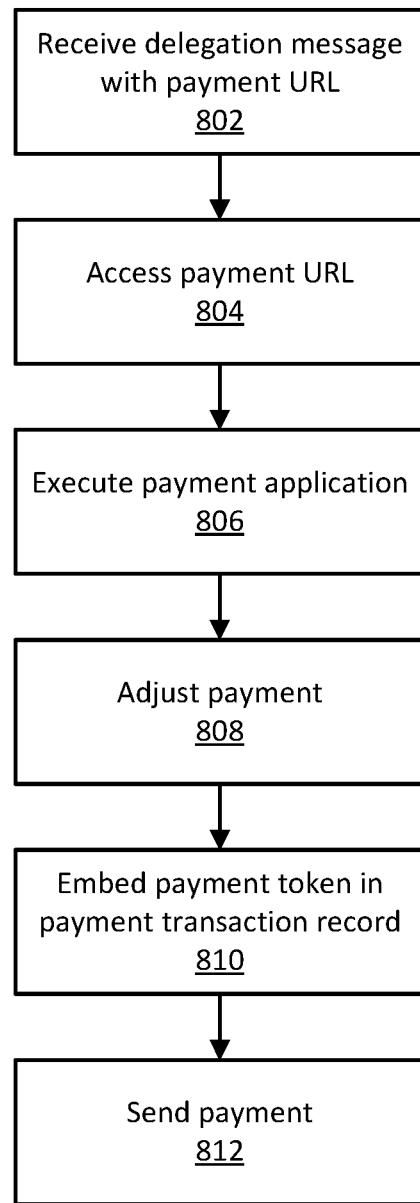

Referring to FIG. 8, an example method for payment of a delegated portion of a multi-party transaction is provided.

At step 802, a delegate, e.g., a party to a multi-party transaction or a multi-party event, may receive a delegation message transmitted from the payment delegation module 120 of the multi-party transaction decisioning system 100. The delegation message may be received at a device used by the delegate, such as the one or more delegate computing devices 150. In the case where the delegate also has the banking application 111 installed at the one or more delegate computing devices 150 or has website access to the banking application 111, the delegation message may be output via a user interface of the banking application 111. Alternatively or additionally, the delegation message may be received as an email, a text, via social media, or the like. The delegation message may display the details of the delegation request and the payment URL (as described in FIG. 7). In some instances, the details of the delegation request may be displayed upon accessing the payment URL. In some cases, the delegation message may include options to accept, decline, or transfer the delegation request to another individual. The delegate may select one of the options, and the requesting user may be notified of the selected option. In the case of transferring the delegation request, the transfer option may provide a user interface for receiving contact information, such as an email address or a phone number, of a sub-delegate and receiving an amount to be delegated to the sub-delegate. Upon submission of a request to transfer the delegation request, a script may be executed to update the delegation request stored in the database 130, or in a memory associated with the user computing device 140*a*, with information associated with the sub-delegate or to generate a new delegation request associated with the sub-delegate. The updated or new delegation request may be stored in the database 130, or in a memory associated with the user computing device 140*a*, and a delegation message may be transmitted to the sub-delegate for payment of the delegated amount. Any payment made by the sub-delegate may be paid to the payee in the original delegation request.

At step 804, if the delegate decides the accept the delegation request, the delegate may access the payment URL by clicking on the link displayed in the delegation message or by copying and pasting the link into a web browser. Accessing the link may cause a payment process to be initiated for submitting payment from the delegate to the payee. For instance, accessing the link may trigger the execution of a script at the one or more delegate computing devices 150. The script may cause an application or website associated with a default payment method associated with the one or more delegate computing devices 150 to be identified and executed. Alternatively or additionally, the script may cause a request to be output at the one or more delegate computing devices 150 for the delegate to select a preferred payment method application for using in making payment to the user.

At step 806, the one or more delegate computing devices 150 may execute the application or website associated with the default or selected payment method. The script may call one or more APIs for interfacing with the payment application or website. The script and/or the API may cause one or more fields associated with the payment application or website to be prepopulated with the payment information associated with the delegation request, such as a payment amount and recipient information identifying where payment should be made. The recipient information need not be sensitive financial information, such as a bank account or credit card number of the user, and instead may be information identifying the payee associated with the delegation request by an email address or a phone number associated with the user, which may later be used at a secure source device, such as the multi-party transaction decisioning device 110, to access the payee's financial information. The delegate may adjust the prepopulated fields as needed. For instance the delegate may adjust the payment amount to enter a different amount.

At step 808, the script and/or API executing at the one or more delegate computing devices 150 may determine whether to adjust the payment amount from the amount requested in the delegation request to a different amount. Such an adjustment may be necessary if delegation requests for a selected transaction were sent to more than one delegate and one or more of the delegates made a payment exceeding their respective requested amount, thus causing the remaining amount, of the total requested, needing to be paid by a final delegate to be less than the amount the requesting user originally requested. For instance, prior to the delegate's submission of payment, the script and/or API may query the multi-party transaction decisioning device 110 to determine if the requested payment amount for the delegate exceeds an outstanding or remaining amount to be paid toward the delegated transaction. If the requested payment amount exceeds the remaining amount to be paid toward the delegated transaction, the delegate's payment amount may be adjusted.

At step 810, the script and/or API executing at the one or more delegate computing devices 150 may additionally cause a payment transaction generated by the delegate's payment method to be embedded with the payment token that was included in the payment URL. The script and/or API may cause the payment token to be embedded or stored in a field of the payment transaction record prior to the delegate submitting the payment transaction. Alternatively, the script and/or API may cause the payment token to be embedded in the payment transaction record upon receiving an indication that the delegate has submitted the payment transaction. The payment transaction record may comprise a number of fields and structure in accordance with a standard format used by the payment processing system 160. For instance, for an ACH network payment processing system, the payment transaction record may comprise a structure and layout consistent with the National Automated Clearing House Association (NACHA) standard ACH entry detail and/or entry detail addenda records. The script and/or API may cause the payment token to be stored in one of the standard fields of the transaction record—such as a memo, discretionary, miscellaneous, or other unused field of the payment transaction record. For instance, if the delegate chooses to make an ACH payment to the user, the payment token may be embedded in one of the standard unused fields of the ACH entry detail or entry detail addenda transaction records. When the payment transaction is transmitted to the payment processing system 160 and eventually arrives at the user's bank, the payment token may be detected in the payment transaction record and may be used to link the delegate's payment back to the original multi-party transaction or multi-party event.

At step 812, upon receiving an indication at the one or more delegate computing devices 150 that the delegate has submitted payment, the delegate computing device 150 may send the payment transaction record to the payment processing system 160. The payment processing system 160 may receive the payment transaction record associated with the payment made by the delegate to the payee. The payment processing system 160 may coordinate a settlement process between a bank associated with the delegate and a bank associated with the payee. The payment processing system 160 may coordinate sending the payment transaction record associated with the delegate's payment transaction to the payee's bank so funds for payment may be debited from the delegate's selected payment account and transmitted to the bank associated with the payee. For instance, the multi-party transaction decisioning device 110 may ultimately receive the payment transaction record associated with the delegate's payment and may credit the payee's payment account with the payment amount. The received payment transaction record may be embedded with the payment token stored therein at step 716, so that upon receipt at the payee's bank may be recognized as a payment for a multi-party transaction or multi-party event.

One or more aspects disclosed herein may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language, such as (but not limited to) HTML or XML. The computer-executable instructions may be stored on a computer-readable medium, such as a hard disk, optical disk, removable storage media, solid-state memory, RAM, or the like. As will be appreciated by one of skill in the art, the functionality of the program modules may be combined or distributed as desired in various embodiments. In addition, the functionality may be embodied in whole, or in part, in firmware or hardware equivalents such as integrated circuits, field programmable gate arrays (FPGA), or the like. Particular data structures may be used to more effectively implement one or more aspects disclosed herein, and such data structures are contemplated within the scope of computer-executable instructions and computer-usable data described herein. Various aspects disclosed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
obtaining, by a computing device, transaction data comprising a plurality of transactions associated with a first user;
analyzing, using a machine learning model, the transaction data by comparing the transaction data to a spend profile associated with the first user, wherein the spend profile comprises information indicating a typical spend amount associated with the first user;
using the machine learning model and based on the analyzing, identifying as a candidate multi-party transaction, a first transaction, of the plurality of transactions, having a transaction amount greater, by a threshold amount, than the typical spend amount associated with the first user;
generating, using the machine learning model and based on the spend profile, a confidence metric indicating a likelihood that the candidate multi-party transaction is a multi-party transaction, wherein the multi-party transaction comprises a transaction for a purchase shared with one or more other parties;
generating, by the computing device, a payment token for the multi-party transaction, wherein the payment token comprises a uniform resource locator (URL) link to access information on a plurality of delegation requests associated with the first transaction;

transmitting, to a user device associated with the first user and based on the confidence metric exceeding a threshold value, a notification indicating identification of the multi-party transaction; and transmitting, to one or more devices associated with the one or more other parties, a delegation request comprising the payment token, wherein the delegation request comprises information indicating a portion of the transaction amount that the first user request payment from the one or more other parties.

2. The computer-implemented method of claim 1, wherein analyzing the transaction data comprises:
identifying, for each transaction of the plurality of transactions, one or more of:
a transaction amount associated with the transaction;
a merchant associated with the transaction; and
a category of the merchant associated with the transaction; and
determining, based on the spend profile associated with the first user, the typical spend amount associated with the first user as an average amount spent by first user for a merchant of the identified category.

3. The computer-implemented method of claim 2, wherein identifying the first transaction as the candidate multi-party transaction is based on:
determining, based on a merchant profile associated with the merchant, a typical transaction amount for the merchant; and
determining that the transaction amount of the first transaction is greater than the typical transaction amount for the merchant.

4. The computer-implemented method of claim 1, further comprising:
generating a training dataset record comprising information associated with the multi-party transaction;
receiving, from the user device, a user input indicating whether the identification of the multi-party transaction is correct;
labeling, based on the user input, the training dataset record as a multi-party transaction record or an individual transaction record; and
updating the machine learning model with the labeled training dataset record.

5. The computer-implemented method of claim 1, further comprising:
determining a location and a time associated with the multi-party transaction;
receiving additional data comprising an indication that a second user is located proximate to the location at the determined time; and
identifying, based on the additional data, the second user as one of the one or more other parties.

6. The computer-implemented method of claim 5, further comprising:
receiving, based on accessing a social media account associated with the first user, a list of one or more associates of the first user, wherein the one or more associates comprise the second user; and
transmitting, to one or more computing devices associated with the one or more associates of the first user, a request for the additional data.

7. The computer-implemented method of claim 5, wherein the additional data comprises one or more of:
location data associated with a computing device associated with the second user, or
travel itinerary data indicating the second user has traveled to the location in a time frame encompassing the identified time.

8. The computer-implemented method of claim 5, further comprising:
obtaining, from the user device associated with the first user, contact information for the second user;
generating a second delegation request for the second user and associated with the multi-party transaction, wherein the second delegation request comprises information indicating a portion of the transaction amount that the first user requests payment from the second user; and
transmitting, to the second user using the contact information, the second delegation request.

9. A computing device comprising:
at least one processor; and
memory storing instructions that, when executed by the at least one processor, cause the computing device to:
obtain transaction data comprising a plurality of transactions associated with a first user;
analyze, using a machine learning model, the transaction data by comparing the transaction data to a spend profile associated with the first user, wherein the spend profile comprises information indicating a typical spend amount associated with the first user;
using the machine learning model and based on the analysis, identify as a candidate multi-party transaction a first transaction, of the plurality of transactions, having a transaction amount greater, by a threshold amount, than the typical spend amount associated with the first user;
generate, using the machine learning model and based on the spend profile, a confidence metric indicating a likelihood that the candidate multi-party transaction is a multi-party transaction, wherein the multi-party transaction comprises a transaction for a purchase shared with one or more other parties;
generate a payment token for the multi-party transaction, wherein the payment token comprises a uniform resource locator (URL) link to access information on a plurality of delegation requests associated with the first transaction; and
transmit, to a user device associated with the first user and based on the confidence metric exceeding a threshold value, a notification indicating identification of the multi-party transaction; and
transmit, to the one or more devices associated with the one or more other parties, a delegation request comprising the payment token, wherein the delegation request comprises information indicating a portion of the transaction amount that the first user requests payment from the one or more other parties.

10. The computing device of claim 9, wherein the instructions, when executed by the at least one processor, cause the computing device to:
analyze the transaction data by:
identifying, for each transaction of the plurality of transactions, one or more of:
a transaction amount associated with the transaction;
a merchant associated with the transaction; and
a category of the merchant associated with the transaction; and
determining, based on the spend profile associated with the first user, the typical spend amount associated with the first user as an average amount spent by first user for a merchant of the identified category; and identify the first transaction as the candidate multi-party transaction is based on:
    determining, based on a merchant profile associated with the merchant, a typical transaction amount for the merchant; and
    determining that the transaction amount of the first transaction is greater than the typical transaction amount for the merchant.

11. The computing device of claim 9, wherein the instructions, when executed by the at least one processor, cause the computing device to:
    generate a training dataset record comprising information associated with the multi-party transaction;
    receive, from the user device, a user input indicating whether the identification of the multi-party transaction is correct;
    label, based on the user input, the training dataset record as a multi-party transaction record or an individual transaction record; and
    update the machine learning model with the labeled training dataset record.

12. The computing device of claim 9, wherein the instructions, when executed by the at least one processor, cause the computing device to:
    determine a location and a time associated with the multi-party transaction;
    receive additional data comprising an indication that a second user is located proximate to the location at the determined time; and
    identify, based on the additional data, the second user as one of the one or more other parties.

13. The computing device of claim 12, wherein the instructions, when executed by the at least one processor, cause the computing device to:
    receive, based on accessing a social media account associated with the first user, a list of one or more associates of the first user, wherein the one or more associates comprise the second user; and
    transmit, to one or more computing devices associated with the one or more associates of the first user, a request for the additional data.

14. The computing device of claim 12, wherein the additional data comprises one or more of:
    location data associated with a computing device associated with the second user, or
    travel itinerary data indicating the second user has traveled to the location in a time frame encompassing the identified time.

15. The computing device of claim 12, wherein the instructions, when executed by the at least one processor, cause the computing device to:
    obtain, from the user device associated with the first user, contact information for the second user;
    generate a second delegation request for the second user and associated with the multi-party transaction, wherein the second delegation request comprises information indicating a portion of the transaction amount that the first user requests payment from the second user; and
    transmit, to the second user using the contact information, the second delegation request.

16. A non-transitory, computer-readable medium storing instructions that, when executed by at least one processor, cause:
    obtaining transaction data comprising a plurality of transactions associated with a first user;
    analyzing, using a machine learning model, the transaction data by comparing the transaction data to a spend profile associated with the first user, wherein the spend profile comprises information indicating a typical spend amount associated with the first user;
    using the machine learning model and based on the analyzing, identifying as a candidate multi-party transaction a first transaction, of the plurality of transactions, having a transaction amount greater, by a threshold amount, than the typical spend amount associated with the first user;
    generating, using the machine learning model and based on the spend profile, a confidence metric indicating a likelihood that the candidate multi-party transaction is a multi-party transaction, wherein the multi-party transaction comprises a transaction for a purchase shared with one or more other parties;
    generating a payment token for the multi-party transaction, wherein the payment token comprises a uniform resource locator (URL) link to access information on a plurality of delegation requests associated with the first transaction;
    transmitting, to a user device associated with the first user and based on the confidence metric exceeding a threshold value, a notification indicating identification of the multi-party transaction; and
    transmitting, to one or more devices associated with the one or more other parties, a delegation request comprising the payment token, wherein the delegation request comprises information indicating a portion of the transaction amount that the first user requests payment from the one or more other parties.

17. The non-transitory, computer-readable medium of claim 16, wherein the instructions, when executed by the at least one processor, further cause:
    analyzing the transaction data by:
        identifying, for each transaction of the plurality of transactions, one or more of:
            a transaction amount associated with the transaction;
            a merchant associated with the transaction; and
            a category of the merchant associated with the transaction; and
        determining, based on the spend profile associated with the first user, the typical spend amount associated with the first user as an average amount spent by first user for a merchant of the identified category; and
    identifying the first transaction as the candidate multi-party transaction is based on:
        determining, based on a merchant profile associated with the merchant, a typical transaction amount for the merchant; and
        determining that the transaction amount of the first transaction is greater than the typical transaction amount for the merchant.

18. The non-transitory, computer-readable medium of claim 16, wherein the instructions, when executed by the at least one processor, further cause:
    generating a training dataset record comprising information associated with the multi-party transaction;
    receiving, from the user device, a user input indicating whether the identification of the multi-party transaction is correct;
    labeling, based on the user input, the training dataset record as a multi-party transaction record or an individual transaction record; and
    updating the machine learning model with the labeled training dataset record.

19. The non-transitory, computer-readable medium of claim 16, wherein the instructions, when executed by the at least one processor, further cause:
- determining a location and a time associated with the multi-party transaction;
- receiving additional data comprising an indication that a second user is located proximate to the location at the determined time; and
- identifying, based on the additional data, the second user as one of the one or more other parties.

20. The non-transitory, computer-readable medium of claim 19, wherein the instructions, when executed by the at least one processor, further cause:
- receiving, based on accessing a social media account associated with the first user, a list of one or more associates of the first user, wherein the one or more associates comprise the second user; and
- transmitting, to one or more computing devices associated with the one or more associates of the first user, a request for the additional data, wherein the additional data comprises one or more of:
  - location data associated with a computing device associated with the second user, or
- travel itinerary data indicating the second user has traveled to the location in a time frame encompassing the identified time.

21. The computer-implemented method of claim 1, further comprising:
- detecting the payment token in a standardized field of second transaction data associated with a second transaction;
- linking, based on the payment token, the second transaction to the first transaction; and
- causing display, on a user interface of the user device associated with the first user, a transaction summary comprising the first transaction associated with the first user and the second transaction associated with the payment, by the second user, of the portion of the transaction amount of the first transaction.

* * * * *